(12) United States Patent
Armstrong-Crews et al.

(10) Patent No.: US 12,153,437 B2
(45) Date of Patent: *Nov. 26, 2024

(54) DETECTION OF PARTICULATE MATTER IN AUTONOMOUS VEHICLE APPLICATIONS

(71) Applicant: Waymo LLC, Mountain View, CA (US)

(72) Inventors: Nicholas Armstrong-Crews, Mountain View, CA (US); Arthur Safira, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,040

(22) Filed: Apr. 7, 2023

(65) Prior Publication Data

US 2023/0244242 A1 Aug. 3, 2023

Related U.S. Application Data

(63) Continuation of application No. 17/247,353, filed on Dec. 8, 2020, now Pat. No. 11,656,629.

(51) Int. Cl.
*G01S 17/58* (2006.01)
*G01P 5/26* (2006.01)
(Continued)

(52) U.S. Cl.
CPC ............... *G05D 1/0231* (2013.01); *G01P 5/26* (2013.01); *G01S 17/58* (2013.01); *G01S 17/88* (2013.01); *G05D 1/0223* (2013.01)

(58) Field of Classification Search
CPC ........ G01S 17/58; G01S 17/34; G01S 17/931; G01S 17/66; G01S 7/481; G01S 7/491; B60W 40/02; G05D 1/02
See application file for complete search history.

(56) References Cited

U.S. PATENT DOCUMENTS 8,112,223 B2 2/2012 Jordan et al.
9,851,470 B2 12/2017 Henderson et al.
(Continued)

FOREIGN PATENT DOCUMENTS

CN 106560725 A 4/2017
CN 108027440 A 5/2018
(Continued)

OTHER PUBLICATIONS

Extended European Search Report dated Nov. 1, 2022, for application No. 22175897.2.
(Continued)

*Primary Examiner* — Tan Q Nguyen
(74) *Attorney, Agent, or Firm* — LOWENSTEIN SANDLER LLP

(57) ABSTRACT

Aspects and implementations of the present disclosure address shortcomings of the existing technology by enabling lidar-assisted segmentation and identification of particulate matter in autonomous vehicle (AV) applications, by: obtaining, by a sensing system of the AV, a plurality of return points, each return point having one or more velocity values and one or more coordinates of a reflecting region that reflects a signal emitted by the sensing system, identifying, in view of the one or more velocity values of each of a first set of the return points of the plurality of return points, that the first set of the return points is associated with a particulate matter in an environment of the AV, and causing a driving path of the AV to be determined in view of the particulate matter.

20 Claims, 12 Drawing Sheets

(51) Int. Cl.
 *G01S 17/88* (2006.01)
 *G05D 1/00* (2006.01)
 *B60W 40/02* (2006.01)

(56) References Cited

U.S. PATENT DOCUMENTS

| | | |
|---|---|---|
| 10,262,234 B2 | 4/2019 | Li et al. |
| 10,620,631 B1 | 4/2020 | Abeloe |
| 10,884,422 B2 | 1/2021 | Zhang et al. |
| 10,891,744 B1 | 1/2021 | Wyffels |
| 11,029,395 B1 | 6/2021 | Barber |
| 11,328,210 B2 | 5/2022 | Mondello et al. |
| 11,448,735 B2 | 9/2022 | O Keeffe |
| 2005/0099637 A1 | 5/2005 | Kacyra et al. |
| 2005/0285774 A1 | 12/2005 | Wittenberg et al. |
| 2007/0219720 A1 | 9/2007 | Trepagnier et al. |
| 2010/0161225 A1 | 6/2010 | Hyung et al. |
| 2012/0064949 A1 | 3/2012 | Kavounas |
| 2014/0307247 A1* | 10/2014 | Zhu ................ B60W 40/064 342/54 |
| 2014/0347207 A1 | 11/2014 | Zeng et al. |
| 2015/0198711 A1 | 7/2015 | Zeng et al. |
| 2017/0097410 A1 | 4/2017 | Liu et al. |
| 2018/0136321 A1 | 5/2018 | Verghese |
| 2018/0283851 A1 | 10/2018 | Watanabe et al. |
| 2018/0335787 A1* | 11/2018 | Zeng .................... G01S 7/41 |
| 2018/0348343 A1* | 12/2018 | Achour ................ H01Q 1/364 |
| 2019/0011541 A1 | 1/2019 | O Keeffe |
| 2019/0079193 A1 | 3/2019 | Gunnam |
| 2019/0120955 A1 | 4/2019 | Zhong et al. |
| 2019/0138822 A1 | 5/2019 | Yao et al. |
| 2019/0302767 A1 | 10/2019 | Sapp et al. |
| 2019/0317219 A1* | 10/2019 | Smith .................... G01S 17/931 |
| 2019/0318206 A1 | 10/2019 | Smith |
| 2020/0041619 A1 | 2/2020 | Maheshwari et al. |
| 2020/0182992 A1 | 6/2020 | Kellner et al. |
| 2020/0201351 A1 | 6/2020 | Armstrong-Crews et al. |
| 2020/0301013 A1 | 9/2020 | Banerjee et al. |
| 2020/0302237 A1 | 9/2020 | Hennings Yeomans et al. |
| 2020/0309957 A1 | 10/2020 | Bhaskaran |
| 2020/0371228 A1 | 11/2020 | Wang |
| 2020/0398894 A1 | 12/2020 | Hudecek |
| 2020/0400821 A1 | 12/2020 | Baker |
| 2021/0001868 A1 | 1/2021 | Ahn et al. |
| 2021/0024069 A1 | 1/2021 | Herman et al. |
| 2021/0049779 A1 | 2/2021 | Harviainen |
| 2021/0056713 A1 | 2/2021 | Rangesh et al. |
| 2021/0097723 A1 | 4/2021 | Kim et al. |
| 2021/0141092 A1 | 5/2021 | Chen et al. |
| 2021/0173055 A1 | 6/2021 | Jian et al. |
| 2021/0229657 A1 | 7/2021 | Herman |
| 2021/0255307 A1 | 8/2021 | Bongio Karrman et al. |
| 2021/0256321 A1 | 8/2021 | Gerardo Castro et al. |
| 2021/0261152 A1 | 8/2021 | Meijburg |
| 2021/0261159 A1 | 8/2021 | Pazhayampallil et al. |
| 2021/0339738 A1 | 11/2021 | Lashkari et al. |
| 2021/0396887 A1 | 12/2021 | Schmalenberg |
| 2022/0058402 A1 | 2/2022 | Hunt |
| 2022/0119002 A1 | 4/2022 | Ladd |
| 2022/0122363 A1 | 4/2022 | Liong |
| 2022/0128995 A1 | 4/2022 | Chen et al. |
| 2022/0146676 A1 | 5/2022 | Armstrong-Crews et al. |
| 2022/0229164 A1 | 7/2022 | Steinberg et al. |
| 2022/0276375 A1 | 9/2022 | Armstrong-Crews |
| 2022/0327719 A1* | 10/2022 | Shaag ................ G01C 21/3885 |
| 2023/0076905 A1 | 3/2023 | Wyffels |

FOREIGN PATENT DOCUMENTS

| | | |
|---|---|---|
| CN | 111612818 A | 9/2020 |
| CN | 112041702 A | 12/2020 |
| EP | 3151034 A1 | 4/2017 |
| EP | 3252501 A1 | 12/2017 |
| EP | 3346287 A1 | 7/2018 |
| EP | 3367121 A1 | 8/2018 |
| EP | 3525000 A1 | 8/2019 |
| EP | 3367121 B1 | 4/2020 |
| EP | 3745158 A1 | 12/2020 |
| EP | 3775997 A2 | 2/2021 |
| JP | 2012518793 A | 8/2012 |
| JP | 2015035019 A | 2/2015 |
| JP | 2019049774 A | 3/2019 |
| KR | 20200011813 A | 2/2020 |
| KR | 20200139779 A | 12/2020 |
| WO | 2014168851 A1 | 10/2014 |
| WO | 2017038659 A1 | 3/2017 |
| WO | 2018127789 A1 | 7/2018 |
| WO | 2019154536 A1 | 8/2019 |
| WO | 2019199473 A2 | 10/2019 |
| WO | 2020210276 A1 | 10/2020 |
| WO | 2022087308 A1 | 4/2022 |
| WO | 2022094429 A1 | 5/2022 |

OTHER PUBLICATIONS

International Search Report and Written Opinion dated Feb. 18, 2022, on application No. PCT/US2021/057622, 12 pages.
International Search Report and Written Opinion dated Feb. 15, 2022, on application No. PCT/US2021/056105, 10 pages.
International Search Report and Written Opinion dated Feb. 23, 2022, on application No. PCT/US2021/057623, 10 pages.
AEYE iDAR "iDAR is Smarther than LiDAR", aeye.ai/idar/, retrieved Oct. 20, 2020, 11 pages.
Aurora "FMCW Lidar: The Self-Driving Game-Changer" medium.com/aurora-blog/fmcw-lidar-the-self-driving-game-changer-194fd311fd0e9, Apr. 9, 2020, retreived on Oct. 20, 2020, 6 pages.
GreenCarCongress.com "Aeva Announces Aeries 4D FMCW Lidar-on-chip for Autonomous Driving; Recent Porsche Investment", greencarcongress.com/2019/12/20191212.aeva.html, Dec. 12, 2019, 11 pages.
Cameron O., "An Introduction to LIDAR: The Key Self-Driving Car Sensor," Voyage, May 9, 2017, pp. 1-21.
International Preliminary Report on Patentability for International Application No. PCT/US2021/056105, mailed May 4, 2023, 7 Pages.
International Preliminary Report on Patentability for International Application No. PCT/US2021/057622, mailed May 11, 2023, 7 Pages.
International Preliminary Report on Patentability for International Application No. PCT/US2021/057623, mailed May 11, 2023, 7 Pages.
Office Action for Japanese Patent Application No. JP20230520411, mailed Dec. 26, 2023, 13 Pages.

* cited by examiner

DETECTION OF PARTICULATE MATTER IN AUTONOMOUS VEHICLE APPLICATIONS

RELATED APPLICATIONS

This application is a continuation application of co-pending U.S. patent application Ser. No. 17/247,353, filed Dec. 8, 2020, which is incorporated herein by reference.

TECHNICAL FIELD

The instant specification generally relates to autonomous vehicles. More specifically, the instant specification relates to improving autonomous driving systems and components using light detection and ranging data to assist in identification of particulate matter in autonomous driving environments.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on positioning (e.g., Global Positioning System (GPS)) and road map data. While the positioning and the road map data can provide information about static aspects of the environment (buildings, street layouts, etc.), dynamic information (such as information about other vehicles, pedestrians, cyclists, etc.) is obtained from contemporaneously collected sensing data. Precision and safety of the driving path and of the speed regime selected by the autonomous vehicle depend on the quality of the sensing data and on the ability of autonomous driving computing systems to process the sensing data and to provide appropriate instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1A:
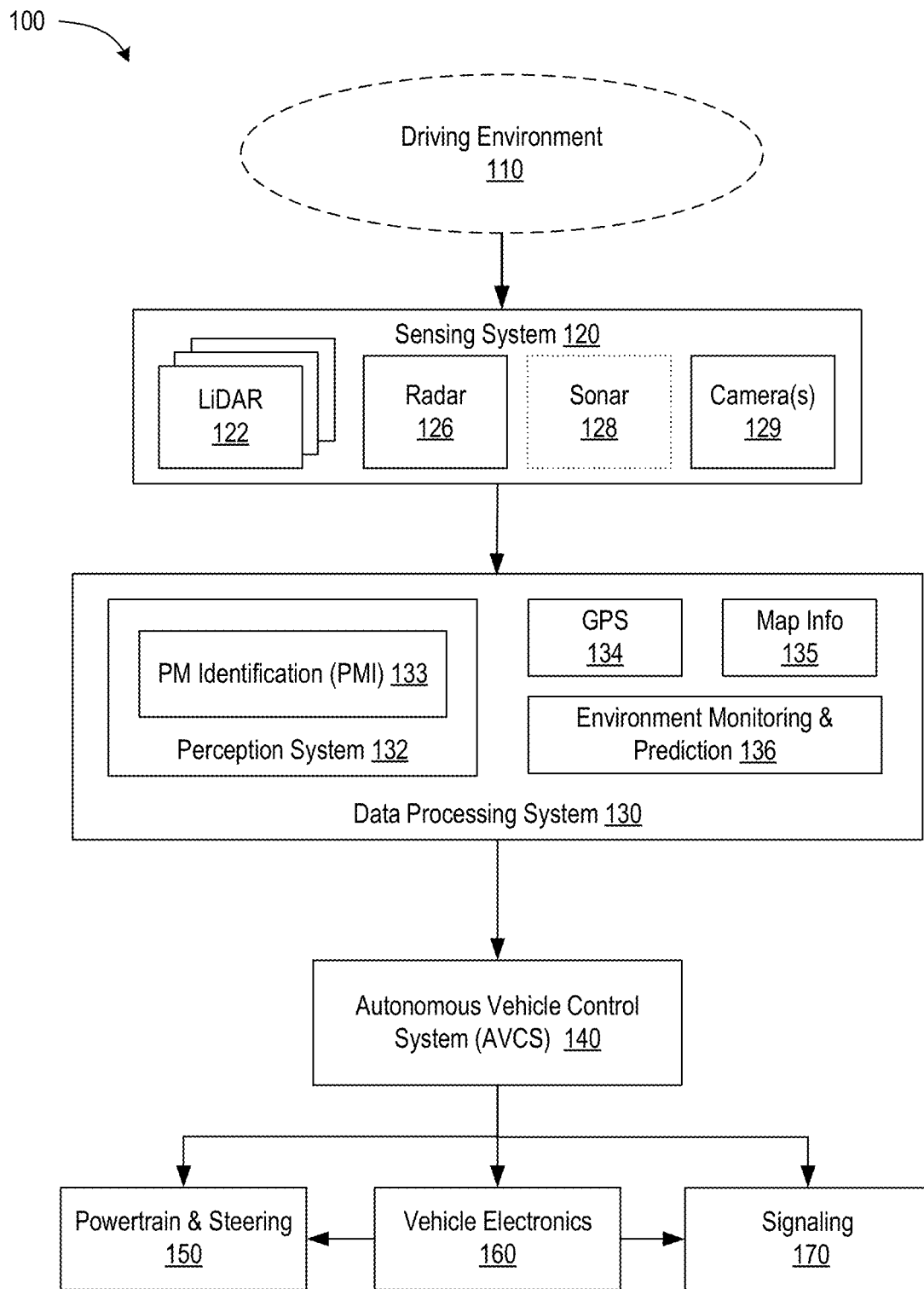
FIG. 1A is a diagram illustrating components of an example autonomous vehicle that uses lidar sensing technology for identification of particulate matter in autonomous driving applications, in accordance with some implementations of the present disclosure.

In one implementation, disclosed is a method of obtaining, by a sensing system of an autonomous vehicle (AV), a plurality of return points, each return point comprising one or more velocity values and one or more coordinates of a reflecting region that reflects a signal emitted by the sensing system, identifying, in view of the one or more velocity values of each of a first set of the return points of the plurality of return points, that the first set of the return points is associated with a particulate matter in an environment of the AV, and causing a driving path of the AV to be determined in view of the particulate matter.

In another implementation, disclosed is a system that includes a sensing system of an AV and a perception system of the AV. The sensing system is to obtain a plurality of return points, each return point comprising one or more velocity values and one or more coordinates of a reflecting region that reflects a signal emitted by the sensing system. The perception system is to identify, in view of the one or more velocity values of each of a first set of the return points of the plurality of return points, that the first set of the return points is associated with a particulate matter in an environment of the AV, and cause a driving path of the AV to be determined in view of the particulate matter.

In another implementation, disclosed is a non-transitory computer-readable medium having instructions stored thereon that, when executed from a computing device, cause the computing device to obtain, by a sensing system of an AV, a plurality of return points, each return point comprising one or more velocity values and one or more coordinates of a reflecting region that reflects a signal emitted by the sensing system, and identify, by a perception system of the AV and in view of the one or more velocity values of each of a first set of the return points of the plurality of return points, that the first set of the return points is associated with a particulate matter in an environment of the AV, and cause a driving path of the AV to be determined in view of the particulate matter.

DETAILED DESCRIPTION

An autonomous vehicle (AV) can employ a light detection and ranging (lidar) technology to detect distances to various objects in the driving environment and, sometimes, the velocities of such objects. A lidar emits one or more laser signals (pulses) that travel to an object and then detects arrived signals reflected from the object. By determining a time delay between the signal emission and the arrival of the reflected waves, a time-of-flight (ToF) lidar can determine the distance to the object. A typical lidar emits signals in multiple directions to obtain a wide view of the outside environment. For example, a lidar device can cover an entire 360-degree view by scanning to collect a series of consecutive sensing frames identified with timestamps. As a result, each sector in space is sensed in time increments $\Delta T$ which are determined by the angular velocity of the lidar's scanning speed. "Frame" or "sensing frame," as used herein, can refer to an entire 360-degree view of the environment obtained over a scan of the lidar or, alternatively, to any smaller sector, e.g., a 1-degree, 5-degree, a 10-degree, or any other angle obtained over a fraction of the scan cycle (revolution), or over a scan designed to cover a limited angle.

Each frame can include numerous return points (or simply "points") corresponding to reflections from various objects of the environment. Each point can be associated with the distance to the corresponding object or, more specifically, with the distance to an element of the reflective surface of the object (reflecting region) responsible for the respective return point. A set of points can be rendered or otherwise associated with a frame and sometimes referred to as a "point cloud." A point cloud can include returns from multiple objects. Typically, it is not known a priori how many objects are within a given frame. A single object, such as another vehicle, a road sign, a pedestrian, and so on, can generate multiple return points. For example, a 10-degree frame can include returns from one or more road signs, multiple vehicles located at various distances from the lidar device (which can be mounted on the AV) and moving with different speeds in different directions, a pedestrian crossing a roadway, walking along a sidewalk, or standing by the roadside, and many other objects. Segmenting (which can be performed by a perception system of the AV) a given point cloud into clusters that correspond to different objects can be useful in autonomous driving applications. Points that are close (e.g., are separated by a small angular distance and correspond to reflections from similar distances) can nonetheless belong to different objects.

Particulate matter (PM) that can be present above or near a roadway can pose additional challenges. "Particulate matter" includes any solid or liquid particles that can be present in the atmosphere including but not limited to mist, fog, rain droplets, snowflakes, dust, sand, spray lifted by vehicles or parts of the vehicles (e.g., by wheels making contact with a wet road surface, or by air flow caused by vehicle's motion, or by other mechanisms), vehicle emissions, smoke from fires blown into or near the roadway, or any other matter that can be a result of atmospheric, natural, or artificial (e.g., technological or other human-caused) environmental conditions. Particulate matter can generate detectable (and in some instances rather strong) lidar return signals that can be recognized (or misrecognized) as solid objects (e.g. vehicles, obstacles) or distort perceived locations and sizes of various objects and that can cause AV to execute an unnecessary (and/or unsafe) driving maneuvers. For example, AV can misrecognize a cloud of mist blown by crosswind into the AV's lane from an oncoming truck as an extension of the truck and can assume that the truck has moved into the AV's lane. As a result, the AV can perform an unnecessary braking (or steering) maneuver, which can result in a traffic slowdown, can cause tailgating vehicles to make contact with the AV or resort to braking/steering that increases a likelihood of an accident, and so on. On the other hand, a correct segmentation of the point cloud into the points belonging to the truck and belonging to the mist (or other PM) would inform the control systems of the AV that it is safe to drive through the mist.

Additionally, particulate matter decreases visibility (especially in foggy or dusty driving environments or when driving through a sandstorm in a desert) for AVs and driver-operated vehicles. As a result, AV's cameras can provide images of reduced quality and depth of perception. Without independent information ("ground truth") about the particulate environment causing such a reduction in perception, a response of the AV to the current environmental conditions can be sub-optimal. Conversely, possessing such a ground truth about the current visibility conditions, the AV can identify that the reduced perception is due to environmental conditions (rather than due to malfunctioning of the AV's sensing system), more accurately predict driving patterns of other vehicles, more reliably estimate road conditions (e.g., slippery vs. dry), and so on.

Aspects and implementations of the present disclosure address these and other problems by enabling lidar-assisted (or radar-assisted) identification of particulate matter. In some implementations, identification of PM can utilize lidar ToF data to determine a spatial distribution of PM. In some implementations, identification of PM can utilize velocity distribution of PM (and other objects) generated using coherent (e.g., Doppler-assisted) lidar data (or radar data). In some implementations, identification of PM can further utilize intensity data (including time-dependent data) to map density of particulates at various points in space. For example, while a velocity distribution of reflecting points belonging to a vehicle is likely to match (within the accuracy of sensing devices) rigid-body velocities, a particulate matter is likely to display a much greater dispersion of velocity values. For example, drifting (or settling down) mist or dust can be characterized by an average (for a given cloud of mist or dust) drift velocity with random (in direction and magnitude) motion of individual particulates superimposed over their net drift. Such a random (or quasi-random) motion can be caused by various vortices, eddies, or other turbulence patterns of air motion.

Whereas in some implementations particulate matter is an environmental factor to be identified, mapped, and used in making driving decisions, in some implementations particulate matter can also be used to identify other environmental conditions, such as a direction and strength of wind that causes the net drift or particulates. Knowledge of the wind velocity can be beneficial both for selecting AV's driving path as well as predicting motion patterns of other vehicles encountered on the road. In particular, trucks (both autonomous and driver-operated) can chart different driving paths (especially while negotiating road turns) depending on the presence or absence of a crosswind. Particulates carried by wind and reflecting lidar signals can provide sufficient velocity data to allow estimation of the wind speed/direction, as described in more detail below.

In some implementations, velocity data can be provided by coherent lidar sensors (or radar sensors) that utilize Doppler-assisted technology. Even though the description below refers to lidar sensors for the sake of specificity, it should be understood that similar implementations, techniques, systems and methods can also be applied for identification of particulate matter (as well as for determination of visibility ranges in the presence of particulate matter) using radar sensors. Unlike ToF lidars, which can identify a velocity of a reflecting object by detecting two or more returned signals and determining how the distance to the object changes with each additional signal (frame), coherent lidars (and radars) are capable of determining the velocity based on a single frame. Specifically, coherent lidars take advantage of a phase information encoded into transmitted signals and carried by the emitted electromagnetic waves to the target and back. A coherent lidar detects changes in the frequency (and/or the accompanying phase) of the reflected wave induced by the motion of the reflecting surface, a phenomenon known as the Doppler effect. The frequency/phase of the reflected wave is sensitive to the component of the velocity of the reflecting surface $V_r$ that is parallel to the direction of the wave propagation, herein referred to as the "radial" or "longitudinal" velocity. A coherent lidar allows, in addition to obtaining the range information, to associate a radial velocity with the return points of the point cloud (radial velocimetry). This additional information, as described in more detail below, enables efficient segmentation of point clouds into clusters corresponding to different objects, e.g., rigid objects (vehicles, road signs, pedestrians, structures, etc.) and particulate matter. More specifically, rigid objects and particulate matter can each have distinct radial velocity signatures that can help with the segmentation process. For example, a motion of a rigid body (such as a body of a car, a truck, an airplane, etc.) can be constrained by the condition that a distance between two arbitrarily chosen points of the body remains fixed (constant) over the course of the body's motion. As a consequence, a motion of a rigid body can be characterized as a combination of a translational motion, which can be described by a translational vector velocity $\vec{V}$ (hereinafter, "velocity") and a rotational motion, which can be described by an angular velocity $\hat{\Omega}$ (hereinafter, "angular velocity"). In the most general case, the two vector velocities amount to six values, e.g., three components of the velocity $\vec{V}=(V_x, V_y, V_z)$ and three components of the angular velocity $\hat{\Omega}=(\Omega_x, \Omega_y, \Omega_z)$, in Cartesian coordinates (or, alternatively, cylindrical, spherical, or any other system of coordinates). As disclosed below, a significant information about the velocities can be determined based on one or more frames obtained by the sensing system of the AV. Such frame(s) can include a mesh of return points corresponding to reflection of different sensing signals, each return point ("point") P including known coordinates (e.g., known from the directional data of the lidar transmitter and the range data extracted from ToF of the reflected sensing signals) and a radial velocity component (herein "radial velocity") $V_r(P)$ of the reflecting surface corresponding to each point P (e.g., extracted by a coherent lidar sensor from Doppler frequency/phase shifts of the reflected signals). In some implementations disclosed, segmentation can be facilitated by fitting the coordinates and the radial velocity of various points to a rigid body equation parameterized by $\vec{V}$ and $\vec{\Omega}$. For example, a hypothesis can be formed that a certain cluster of points corresponds to a single object. Successful fitting of the coordinates and radial velocities of the selected cluster to a rigid-body equation can indicate that the selected hypothesis is likely to be true. Unsuccessful fitting, on the other hand, can disprove the selected hypothesis. As a result, the hypothesis can be discarded or modified. For example, some points can be dropped (pruned) from the selected cluster and the fitting can be repeated. In some implementations, clustering can be performed by various clustering methods (e.g., K-means clustering) in a multi-dimensional space (feature space) where each point P is identified by a vector $\hat{P}=(X, Y, Z, V_r)$ comprising three (or two, in cases of motion of a given surface) spatial coordinates X, Y, Z and the radial velocity $V_r$. Additional dimensions of the multi-dimensional feature space can include intensity values, lateral velocities (e.g., determined by additional sensors, as described below, or via fitting to the rigid body equation), and so on.

Points of the point cloud that correspond to a particulate matter, however, are not constrained by the rigid-body dynamics. Instead, particulates respond readily to the local air flows and can, therefore, display a greater dispersion of velocities, which can vary substantially over relatively short distances, e.g., meters or even fractions of meters. By distinguishing points that fit to the rigid-body dynamics from points that are characterized by a more disordered motion, perception system of the AV can determine the actual boundaries of vehicles (or other rigid objects, e.g., stationary objects) and identify regions that correspond only to PM (with no solid objects behind or objects that are far behind PM). In some implementations, some of the return points can be characterized by multiple detected velocities. For example, a lidar sensing signal can be reflected both from a target surface of a vehicle and from particulates that are floating between the lidar transmitter and the target surface. Such return points can be associated with solid objects rather than with the PM. The portion of the signal that is associated with reflection from the particulates, however, can still be used to identify the density of particulates (e.g., fog, snow, or mist) and/or the maximum range of visibility for the sensing system of the autonomous vehicle.

FIG. 1A is a diagram illustrating components of an example autonomous vehicle (AV) 100 that uses lidar sensing technology for identification of particulate matter in autonomous driving applications, in accordance with some implementations of the present disclosure. FIG. 1A illustrates operations of the example autonomous vehicle. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., sidewalk delivery robotic vehicles) capable of being operated in a self-driving mode (without a human input or with a reduced human input).

A driving environment 110 can include any objects (animated or non-animated) located outside the AV, such as roadways, buildings, trees, bushes, sidewalks, bridges, overpasses, underpasses, tunnels, construction zones, parking features, other vehicles, pedestrians, cyclists, and so on. The driving environment 110 can be urban, suburban, rural, and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the UV range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit can be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion. The term "angular velocity" refers to how fast the object is rotating around some axis as well as the direction of this axis of rotation. For example, a car that is making a left (right) turn has the axis of rotation pointed up (down) and the value of the angular velocity is equal to the rate of change of the angle of rotation (e.g., measured in radians per second).

The sensing system 120 can include one or more lidar sensors 122 (e.g., lidar rangefinders), which can be a laser-based unit capable of determining distances (e.g., using ToF technology) to the objects in the driving environment 110. The lidar sensor(s) can utilize wavelengths of electromagnetic waves that are shorter than the wavelength of the radio waves and can, therefore, provide a higher spatial resolution and sensitivity compared with the radar unit. The lidar sensor(s) can include a coherent lidar sensor, such as a frequency-modulated continuous-wave (FMCW) lidar sensor. The lidar sensor(s) can use optical heterodyne detection for velocity determination. In some implementations, the functionality of a ToF and coherent lidar sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor(s) 122 units can be mounted on AV, e.g., at different locations separated in space, to provide additional information about a transverse component of the velocity of the reflecting object, as described in more detail below.

The lidar sensor(s) 122 can include one or more laser sources producing and emitting signals and one or more detectors of the signals reflected back from the objects. The lidar sensor(s) 122 can include spectral filters to filter out spurious electromagnetic waves having wavelengths (frequencies) that are different from the wavelengths (frequencies) of the emitted signals. In some implementations, the lidar sensor(s) 122 can include directional filters (e.g., apertures, diffraction gratings, and so on) to filter out electromagnetic waves that can arrive at the detectors along directions different from the retro-reflection directions for the emitted signals. The lidar sensor(s) 122 can use various other optical components (lenses, mirrors, gratings, optical films, interferometers, spectrometers, local oscillators, and the like) to enhance sensing capabilities of the sensors.

In some implementations, the lidar sensor(s) 122 scan 360-degree, such as in a horizontal direction. In some implementations, the lidar sensor(s) 122 can be capable of spatial scanning along both the horizontal and vertical directions. In some implementations, the field of view can be up to 90 degrees in the vertical direction (e.g., with that at least a part of the region above the horizon can be scanned by the lidar signals or with at least part of the region below the horizon scanned by the lidar signals). In some implementations, e.g., involving aeronautical applications, the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operates at generally in the near-infrared wavelength, but may include sensing technology that operates at other wavelengths.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of AV 100. For example, the data processing system 130 can include a perception system 132. The perception system 132 can be configured to detect and track objects in the driving environment 110 and to recognize the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (coherent Doppler data and incoherent ToF data) to determine distances to various objects in the environment 110 and velocities (radial and, in some implementations, transverse, as described below) of such objects. In some implementations, the perception system 132 can use the lidar data in combination with the data captured by the camera(s) 129. In one example, the camera (s) 129 can detect an image of road debris partially obstructing a traffic lane. Using the data from the camera(s) 129, perception system 132 can be capable of determining the angular extent of the debris. Using the lidar data, the perception system 132 can determine the distance from the debris to the AV and, therefore, by combining the distance information with the angular size of the debris, the perception system 132 can determine the linear dimensions of the debris as well.

In another implementation, using the lidar data, the perception system 132 can determine how far a detected object is from the AV and can further determine the component of the object's velocity along the direction of the AV's motion. Furthermore, using a series of quick images obtained by the camera, the perception system 132 can also determine the lateral velocity of the detected object in a direction perpendicular to the direction of the AV's motion. In some implementations, the lateral velocity can be determined from the lidar data alone, for example, by recognizing an edge of the object (using horizontal scanning) and further determining how quickly the edge of the object is moving in the lateral direction. The perception system 132 can have a particulate matter identification (PMI) module 133. PMI module 133 can receive one or more sensor data frames from the sensing system 120. Each of the sensor frames can include multiple points. Each point can correspond to a reflecting object from which a signal emitted by the sensing system 120 (e.g., by lidar sensor(s) 122, etc.) is reflected. The type and/or nature of the reflecting object can be unknown, e.g., a surface of a vehicle, road sign, pedestrian, fog, mist, spray, etc. Each point can be associated with various data, such as a timestamp of the frame, coordinates of the reflecting object, radial velocity of the reflecting object, intensity of the reflected signal, and so on. The coordinates can be spherical (or cylindrical) coordinates, in one implementation. For example, the coordinates can include the radial distance, the polar angle (the angle the direction to the respective reflecting surface makes with the vertical direction or a horizontal plane), and the azimuthal angle (the angle indicating the direction within the horizontal plane). The radial distance can be determined from the lidar data whereas the angles can be independently known from a synchronizer data, a clock data, e.g., based on the known lidar scanning frequency within the horizontal plane. The velocity data can be provided to PMI module 133 by lidar sensor(s) 122, in one implementation, based on Doppler-assisted sensing technology. PMI module 133 can use one or more algorithms to perform segmentation of points using velocity data, as described in more detail below. The lidar-assisted identification and classification of PM can then be used by the perception system 132 for efficient and reliable detection and tracking of objects.

The perception system 132 can further receive information from a GPS transceiver (not shown) configured to obtain information about the position of the AV relative to Earth and its surroundings. The positioning data processing module 134 can use the positioning data, e.g., GPS and inertial measurement unit (IMU) data) in conjunction with the sensing data to help accurately determine location of the AV with respect to fixed objects of the driving environment 110, such as roadways, lane boundaries, intersections, sidewalks, crosswalks, road signs, curbs, surrounding buildings, and so on, locations of which can be provided by map information 135. In some implementations, the data processing system 130 can receive non-electromagnetic data, such as audio data (e.g., ultrasonic sensor data, or data from a microphone picking up emergency vehicle sirens), temperature sensor data, humidity sensor data, pressure sensor data, meteorological data (e.g., wind speed and direction, precipitation data), and the like.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the AV relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

The data generated by the perception system 132, the GPS data processing module 134, and the environment monitoring and prediction component 136 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain and steering 150, vehicle electronics 160, signaling 170, and other systems and components not explicitly shown in FIG. 1A. The powertrain and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain and steering 150 to resume the previous speed settings of the vehicle.

Figure 1B:
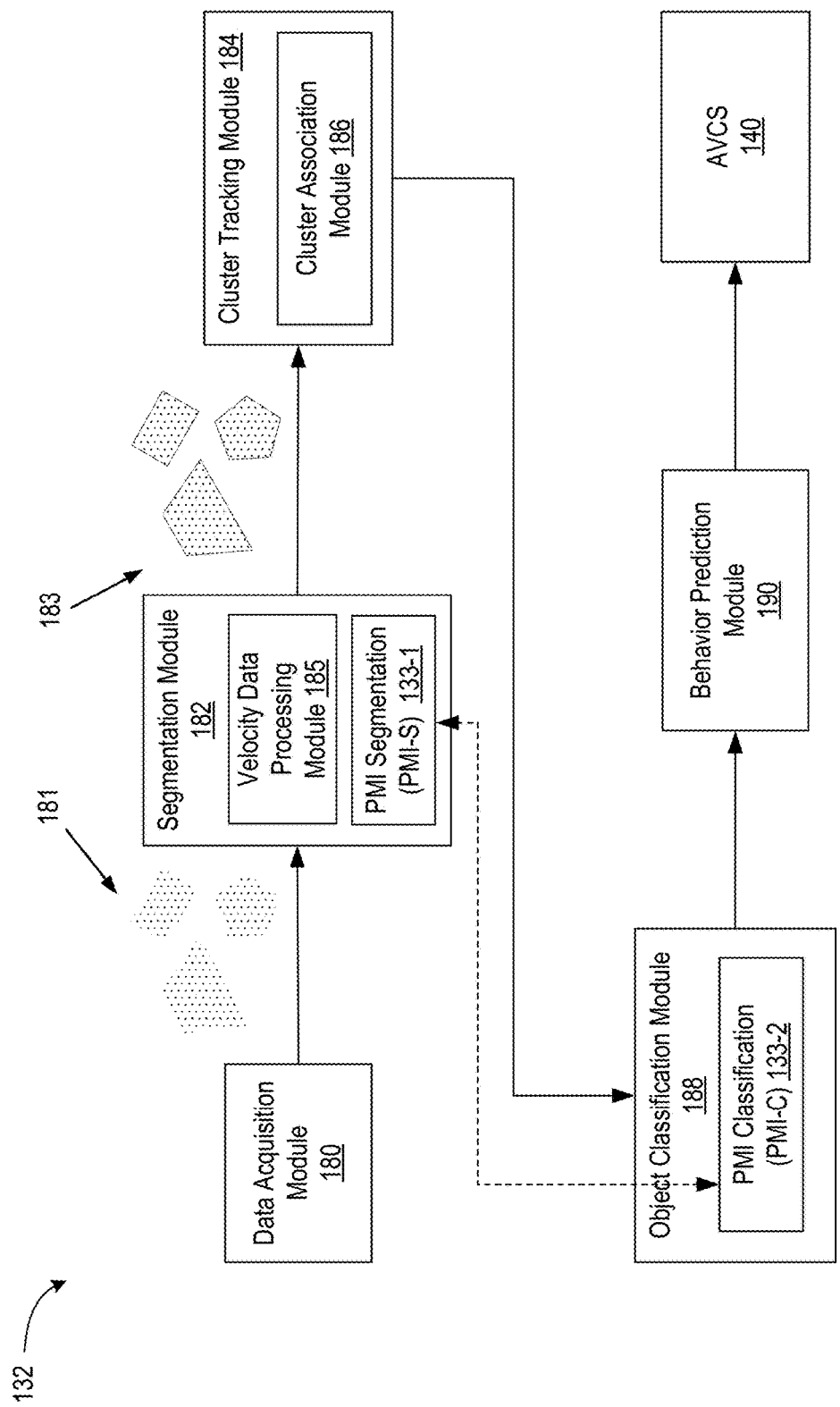
FIG. 1B is a diagram illustrating an example architecture of a perception system of the autonomous vehicle of FIG. 1A that uses lidar sensing technology for identification of particulate matter in autonomous driving applications, in accordance with some implementations of the present disclosure.

FIG. 1B is a diagram illustrating example architecture of a perception system of the autonomous vehicle of FIG. 1A that uses lidar sensing technology for identification of particulate matter in autonomous driving applications, in accordance with some implementations of the present disclosure. A perception system illustrated in FIG. 1B can be perception system 132 of FIG. 1A, in one implementation. An input into perception system 132 may be data obtained by sensing system 120, including distance data and radial velocity data obtained by lidar sensor(s) 122. For example, a data acquisition module 180 may associate each (return) point with coordinates and radial velocities of the respective reflecting region. Various points may correspond to different frames, each frame having a timestamp. In some implementations, to account for a rolling shutter that outputs sensing signals sequentially around the field of view, data acquisition module 180 may associate an individual time stamp with each point, by modifying a global reference timestamp of the respective frame with a time correction within a given frame. Output of data acquisition module 180 can be a point cloud 181 of points corresponding to a sensing frame or a portion of such a frame. Point cloud 181 can be input into a segmentation module 182 where various points of point cloud 181 can be grouped into clusters 183 corresponding to different objects, e.g., moving vehicles, stationary objects, clouds of fog/mist/spray/dust/etc. Segmentation can be performed using a variety of approaches. Clusters can be grouped based on proximity of points in space, proximity of radial velocities of various points, or both. In some implementations, segmentation can use various mapping algorithms (such as iterative closest point (ICP) algorithms) that are capable of mapping points of two different sensing frames. Segmentation can involve formation and verification of hypotheses; for example, a hypothesis that a certain cluster corresponds to a single object can be confirmed or disproved based on distribution of measured (radial) velocities of the points in the cluster, on evolution of the cluster between different sensing frames, and/or by other methods and techniques. In some implementations, velocity estimation can be performed by velocity data processing module 185, as disclosed in more detail below. Segmentation can involve fitting radial velocities and coordinates of various points in hypothesized clusters using rigid-body equation (with one or more sets of translational $\vec{V}$ and rotational $\vec{\Omega}$ velocities, corresponding to various possible objects). Segmentation can further involve PMI segmentation (PMI-S) sub-module 133-1 to identify regions of pure PM (e.g., as regions characterized by a disordered or partially distribution of velocities) as well as regions where lidar returns from PM overlap with returns from rigid objects. Based on the results of the velocity distribution analysis by the velocity data processing module 185 and by PMI-S sub-module 133-1, various hypotheses can be discarded, confirmed, accepted conditionally (subject to additional verification), and so on. Confirmed hypotheses (e.g., output clusters 183) can be provided to a cluster tracking module 184. Cluster tracking module 184 can track motion of the identified clusters 183. In some implementations, tracking of the motion of identified clusters 183 can involve tracking $\vec{V}(\tau)$ and $\vec{\Omega}(\tau)$ of solid objects using multiple additional sensing frames with subsequent timestamps $\tau$ or can be performed based on a single sensing frame. In some implementations, segmentation of solid objects based on identified $\vec{V}$ and $\vec{\Omega}$ can be used to track motion of the objects, using clusters of points from different sensing frames (sensing frames with different timestamps).

Perception system 132 can also use cluster association module 186 for object tracking. Cluster association module 186 can identify clusters belonging to different sensing frames as being associated with the same object, to facilitate tracking of the object's motion as a function of time. Using cluster associations, objects identified by cluster tracking module 184 may be classified by object classification module 188 as being of a particular type (class), such as cars, trucks, buses motorcycles, bicyclists, pedestrians, stationary objects, and so on. Object classification can be performed using various features of the tracked clusters, such as size, positions, velocity (both rotational and translational), pattern of motion (e.g., how often an object stops, how quickly an object accelerates/decelerates), motion in relation to other objects and so on. Object classification module 188 can include PMI classification (PMI-C) sub-module 133-2 for classification of particulate matter. PMI-C sub-module 133-2 can have access to known patterns of lidar data, e.g., snow, mist, dust, rain, sand, and so on. Based on segmentation of the point cloud 181 performed by segmentation module 182 and/or tracking of segmented clusters 183 performed by cluster tracking module 184, PMI-C sub-module 133-2 can determine lidar data patterns (e.g., velocity distributions, density distributions, reflected intensities, etc. produced by various regions of the environment correspond to one of the known type of PM and can, therefore, classify some of segmented (and tracked) clusters 183 as corresponding to PM (and, optionally, to one of the known types of PM). As depicted schematically with the dashed line, PMI-C sub-module 133-2 can communicate with PMI-S sub-module 133-1. For example, PMI-S sub-module 133-1 can be capable, at least in some instances, to identify a PM pattern based on a single sensing frame. In such instances, PMI-S sub-module 133-1 can communicate the identified PM pattern to PMI-C sub-module 133-2 for immediate classification by PMI-C sub-module 133-2 (without waiting for additional sensing frames or tracking by cluster tracking module 184). In some instances, communication in the reverse direction—from PMI-C sub-module 133-2 to PMI-S sub-module 133-1 can occur in a similar manner. For example, PMI-C sub-module 133-2 can classify (e.g., using various known PM patterns) a region of environment as a mist from a wet roadway and notify PMI-S sub-module 133-1 to inform PMI-C sub-module 133-2 about any subsequent changes in the identified PM, such as the PM getting denser, lighter, changing direction of motion, settling on the road surface, blowing away by wind, and the like.

Figure 2A:
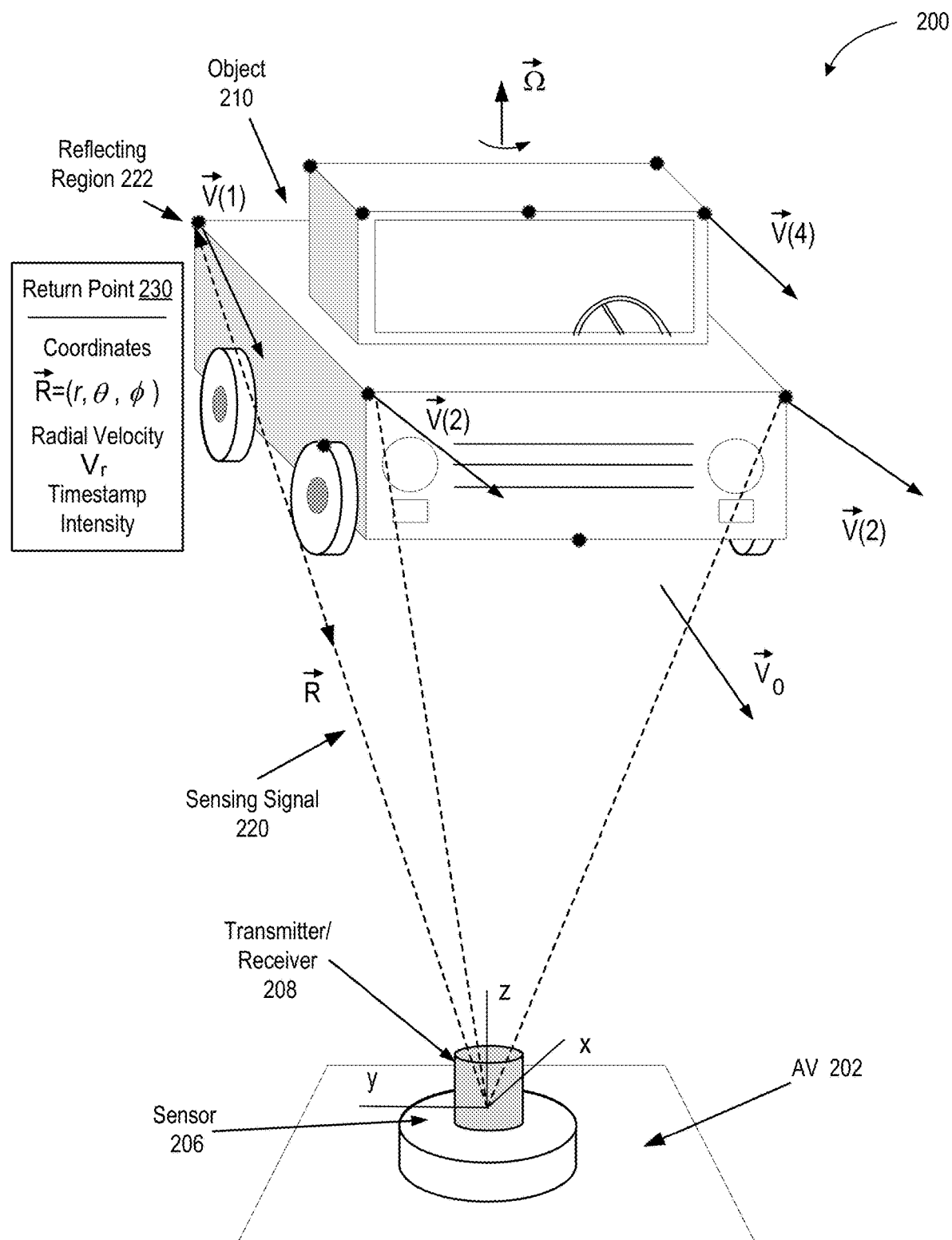
FIG. 2A is an illustration of a velocity sensing setup, as can be used by a perception system of an autonomous vehicle, in accordance with some implementations of the present disclosure.

FIG. 2A is an illustration 200 of a velocity sensing setup, as can be used by a perception system of an autonomous vehicle, in accordance with some implementations of the present disclosure. Depicted is an object 210 (e.g., a car, a truck, etc.) that is moving with some translational velocity $\vec{V}_O$ (e.g. moving forward) while simultaneously rotating with angular velocity $\vec{\Omega}$ (e.g., making a left turn). Also shown is a part of the AV 202 with a sensor 206 mounted thereon. Sensor 206 can include a scanning transmitter/receiver 208 capable of transmitting and receiving sensing (e.g., laser, radar, etc.) signals that probe the outside (relative to AV 202) environment. One sensing frame that corresponds to a single cycle of the transmitter 208 can produce multiple return points from various reflecting regions (depicted with black circles) of the object 210.

A sensing signal 220 can be emitted by a transmitting circuit of the transmitter/receiver 208, reflect from a reflecting region 222 of the object 210, return along the same path and be received by a receiving circuit of the transmitter/receiver 208. The sensing system 120 can associate a return point 230 with the sensing signal 220 and/or reflecting region 222. The return point 230 can include various data that can be extracted from the sensing signal 220, such as the coordinates (which can be in any appropriate system of coordinates, e.g., Cartesian coordinates $\vec{R}=(x, y, z)$, spherical coordinates $\vec{R}=(r, \theta, \phi)$, cylindrical coordinates $\vec{R}=(r, \phi, z)$, or any other system of coordinates; the origin of the coordinate system can be associated with the transmitter/receiver 208, as shown. The returns point can also include such data as the radial velocity $V_r$, a timestamp $\tau$ associated with the sensing signal 220 (e.g., the time of the signal emission or return), the intensity of the returned signal, and other information such as the polarization of the emitted and/or received signal, and the like. Although only the data associated with the return point 230 is depicted in FIG. 2A, other return points associated with the reflecting regions depicted with black circles can include the same or similar type of information. Because the object 210 can be rotating, the velocities of each of the reflecting regions, $\vec{V}(1)$, $\vec{V}(2)$, $\vec{V}(3)$, $\vec{V}(4)$ . . . , can be different from each other. Correspondingly, the detected radial velocities associated with each return point, $V_r(1)$, $V_r(2)$, $V_r(3)$, $V_r(4)$ . . . , can likewise be different from each other. This difference in the detected radial velocities can be used by PMI module 133 for segmentation of point clouds into clusters corresponding to different objects.

Specifically, a cluster properly identified (segmented) as associated with an object (e.g., object 210) that is a rigid body, can be characterized by the velocity distribution is which an element of the object having a radius-vector $\vec{R}$ fits the rigid body equation:

$$\vec{V}=\vec{V}_O+\vec{\Omega}\times(\vec{R}-\vec{R}_O),$$

where $\vec{R}_O$ is the radius vector of some reference point. The reference point can be any element of the object, e.g. an element associated with the return point (3) or any other return point. The choice of the reference point O can be arbitrary since the same rigid body equation exists for any other reference point O', as $$\vec{V}=\vec{V}_O+\vec{\Omega}\times\left(\vec{R}-\vec{R}_{O'}-\vec{R}_O+\vec{R}_{O'}\right)=\vec{V}_{O'}+\vec{\Omega}\times\left(\vec{R}-\vec{R}_{O'}\right),$$

where $\vec{V}_{O'}=\vec{V}_O+\hat{\Omega}\times(\vec{R}_{O'}-\vec{R}_O)$ is the linear velocity of the other reference point O'. Although the linear velocity changes when the reference point is changed, the angular velocity is independent of the choice of the reference point. This independence provides additional flexibility by enabling to choose the reference point based on convenience (e.g., near the center of the cluster of points detected by the sensing system 120). Reference point O may be regarded as the center of object's rotation. A freedom to choose a reference point reflects a possibility to represent an arbitrary displacement of a rigid object via an infinite number of possible combinations of a rotation (about an arbitrarily chosen center but to the same angle and around the same axis) and a translation. (An exception is a purely translational motion.) Accordingly, in some implementations, it may be convenient to choose reference point O to be somewhere inside the object (albeit not necessarily chosen to be close to the object's geometric center or center of mass). In other implementations, it may be convenient to represent object's motion as a pure rotation around an axis parallel to $\hat{\Omega}$ (with no translations within the plane perpendicular to this axis) and a translation along this axis. Such choice of the rotation center (hereinafter referred to as "pure rotation" setup) is unique (up to arbitrary translation along the axis) and may be determined from the condition, $\vec{V}_{O'}=\vec{V}_O+\vec{\Omega}\times(\vec{R}O'-\vec{R}_O)=0$, which gives $$\vec{R}_{O'} = C\vec{\Omega}+\frac{1}{\Omega^2}\left(\vec{\Omega}\times\vec{V}_O+\left(\vec{\Omega}\times\vec{R}_O\right)\times\vec{\Omega}\right),$$

where C is an arbitrary number. At small angular velocities (when the object performs mostly translational motion), as seen from the last expression, rotation center is located at large distances. Accordingly, for the sake of numerical accuracy, in some implementations, possible distances from an object to its center of rotation may be limited, e.g., a pure rotation setup may be changed to a combined rotational-translational setup once it is determined that the center of rotation is farther from the object than some predetermined distance (e.g., a certain number of the object's longest dimension).

Figure 2B:
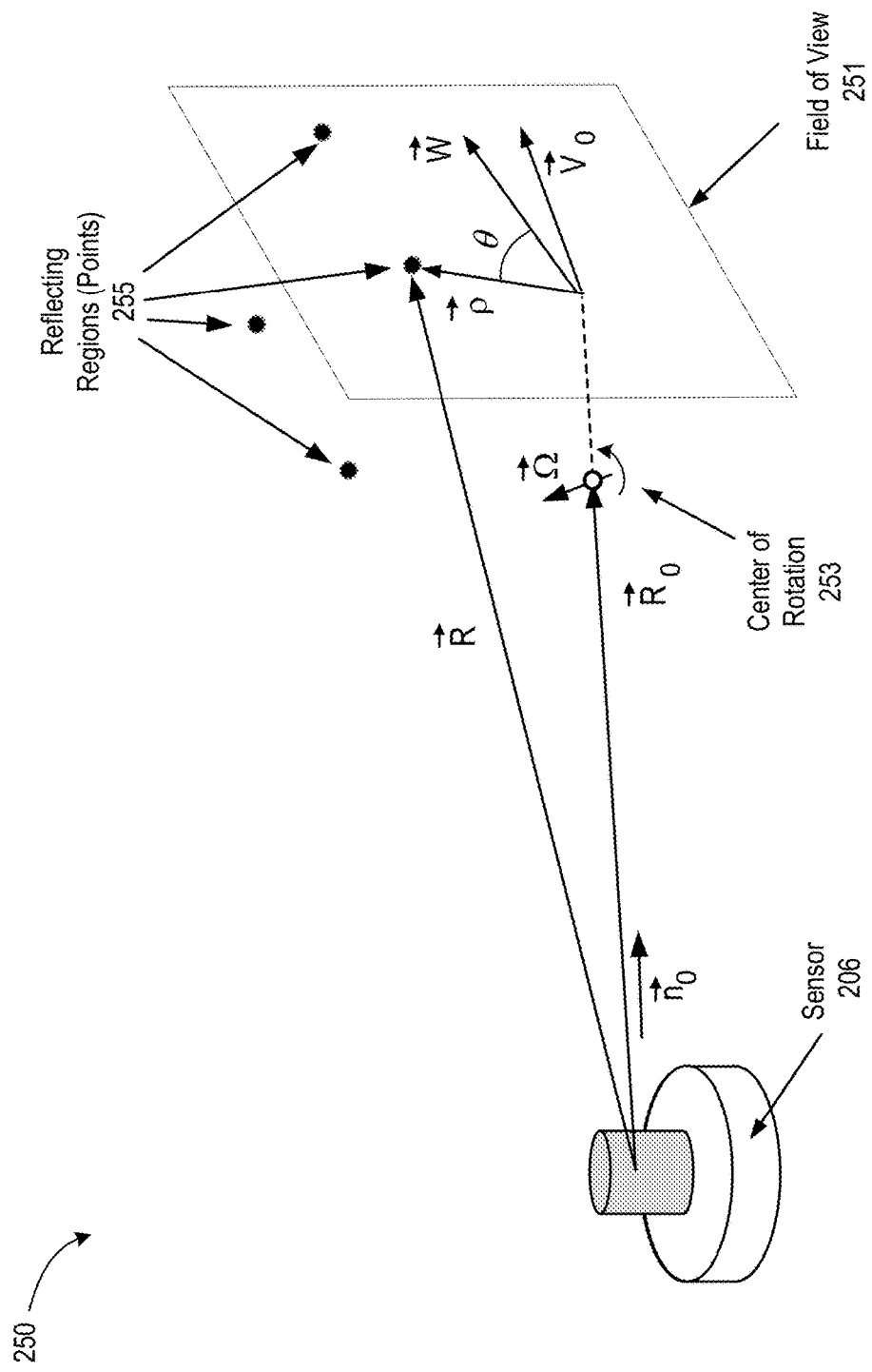
FIG. 2B is an illustration of a setup that can be used for forming geometric representations in relation to segmentation of a point cloud by a perception system of an autonomous vehicle, in accordance with some implementations of the present disclosure.

Segmentation of a point cloud into rigid objects and particulate matter can be performed using hypotheses formation and verification. As one example, the lidar-assisted (e.g., Doppler-assisted) sensing can enable efficient generation of segmentation hypotheses based on a single sensing frame and the assumption that the sensing frame captures rigid objects (which is a reasonable assumption for many objects present in various autonomous driving environments). A rigid body can have a distinct velocity signature even when only the radial velocity component is known. In some implementations, segmentation into rigid objects and PM can be performed with the help of a setup 250 of FIG. 2B that can be used for forming geometric representations by a perception system of an autonomous vehicle, in accordance with some implementations of the present disclosure. The perception system 132 and/or velocity data processing module 185 can select a field of view 251 corresponding to a part of a sensing frame that includes multiple reflecting regions 255 giving rise to respective return points of the point cloud.

The following example refers to a coordinate system in which a point $\vec{R} = R\vec{n}_O + \vec{\rho}$ is identified by the radial distance R along the direction $\vec{n}_O$ towards the reference point $\vec{R}_O = R_O \vec{n}_O$ and by the lateral radius-vector $\vec{\rho} = (x, y, 0)$ that is perpendicular to the direction $\vec{n}_0 = (0,0,1)$: $\vec{\rho} \cdot \vec{n}_O = 0$. The radial component of the velocity can be obtained by taking the scalar (dot) product of both sides of the rigid body equation with the unit vector in the direction of the sensing signal, $(R\vec{n}_O + \vec{\rho})/\sqrt{R^2 + \rho^2}$, and using the cyclic transformation of the triple product:

$$V_r = \vec{V}_O \cdot (R\vec{n}_O + \vec{\rho})/\sqrt{R^2 + \rho^2} + [\vec{\Omega} \times (\vec{n}_O(R - R_O) + \vec{\rho})] \cdot$$
$$(R\vec{n}_O + \vec{\rho})/\sqrt{R^2 + \rho^2} = V_{Or} + (\vec{V}_{O\perp} + R_O \vec{n}_O \times \vec{\Omega}) \cdot \vec{\rho}/\sqrt{R^2 + \rho^2},$$

where $V_{Or} = \vec{V}_O \cdot \vec{n}_O R/\sqrt{R^2 + \rho^2}$, is the radial component of the velocity of the reference point and $\vec{V}_{O\perp}$ is the lateral velocity of the reference point. For objects located at distances that are larger than their size, an acceptable accuracy and further simplification can be achieved by the approximation: $\sqrt{R^2 + \rho^2} \approx R$. It now follows that the radial velocity field within a point cloud has a substantially (within the approximation linear dependence on the in-plane (within the field of view) distance to the reference point O:

$$V_r = V_{Or} + W\rho \cos\theta$$

where W is the magnitude of the in-plane vector $\vec{W} = (\vec{V}_{O\perp} + R_O \vec{n}_O \times \vec{\Omega})/R$, and $\theta$ is the angle that the in-plane vector $\vec{\rho}$ makes with vector $\vec{W}$. Accordingly, the radial velocity field $V_r$ is a linear function of the coordinate along the direction of the in-plane vector $\vec{W}$ that is sensitive to both the lateral translational motion and the rotational motion of the rigid object. The vector $\vec{W}$ represents a gradient of the radial velocity field projected onto the field of view: $\vec{W} = \nabla V_r$. Accordingly, subsets of points of the point cloud that are characterized by different directions of the vector $\vec{W}$ or by different absolute values of vector $\vec{W}$ can be identified as being associated with different objects.

In some implementations, such velocity gradient-based cloud segmentation can be performed as follows. The velocity data processing module 185 and/or PMI-S sub-module 133-1 can select a field of view 251 corresponding to a part of a sensing frame that includes multiple reflecting regions 255 giving rise to respective return points in the point cloud. The perception system 132 and/or velocity data processing module 185 can map the radial velocity field $V_r(\vec{\rho})$ to the lateral coordinates $\vec{\rho} = (x, y, 0)$ of points within the field of view and further determine the discretized representation of the gradient of the radial velocity distribution, $\vec{W}$. Because laser beams used by the sensing system can have a narrow cross section, each reflected signal can be expected to be generated by a single rigid object (even though generation by both a rigid object and PM can be possible). The velocity data processing module 185 and/or PMI-S sub-module 133-1 can, therefore, perform segmentation of the point cloud within the field of view into regions having a linear dependence $V_r(\vec{\rho})$ (or, equivalently, a constant, in magnitude and direction gradient vector $\vec{W}$) and into regions having a disordered distribution $V_r(\vec{\rho})$ (or, equivalently, a disordered gradient vector $\vec{W}$). The velocity data processing module 185 and/or PMI-S sub-module 133-1 can then form one or more hypotheses that associate points belonging to different segmented regions with different objects. The advantage of the Doppler-assisted sensing is that it provides a way to discard or confirm—using a single sensing frame (or a few sensing frames)—hypotheses that contain impossible or unlikely associations. Additional sensing frames can subsequently be used for verification of the formed hypotheses.

The approximations used above to express the radial velocity via the coordinates within the field of view should provide excellent accuracy for most objects in the driving environments. Specifically, an accuracy in approximating the actual distances to the points $\sqrt{R^2 + \rho^2}$ with R are of the order $1 - R/\sqrt{R^2 + \rho^2} \approx 1 - \cos\alpha \approx \alpha^2/2$, where $\tan\alpha = \rho/R$. For the field of view of angle $\alpha = 10°$, the relative error is thus only 1.5%. For additional accuracy in mapping velocity field of closely located objects having larger angles of view, more precise geometric computations can be used to account for fitting the observed dependences of the radial velocity field $V_r$ on the radial distance $\rho$. It should be understood that the above description of velocity gradient-based segmentation is illustrative and that under different conditions various modifications of the procedure can be implemented.

Since the radial velocity $V_r$ can be defined on a finite mesh of points, rather than on a continuum, the gradient vector $\vec{W}$ can be defined using finite differences. For example, if the points in the point cloud have lateral coordinates $(x_j, y_k)$, the finite difference gradient vector can be defined as $$W_x(x_j,y_k) = V_r(x_{j+1},y_k) - V_r(x_j,y_k), W_y(x_j,y_k) = V_r(x_j,y_{k+1}) - V_r(x_j,y_k).$$

Alternatively, the finite difference gradient vector can be defined as $$W_x(x_j,y_k) = V_r(x_j,y_k) - V_r(x_{j-1},y_k), W_y(x_j,y_k) = V_r(x_j,y_k) - V_r(x_j,y_{k-1}),$$

or as a linear combination (e.g., the average value) thereof. The indices j and k can enumerate consecutive points in the point cloud. If a point is missing (e.g., no reflected signal is received from the particular direction), the respective point $(x_j, y_k)$ can be omitted. The coordinates $(x_j, y_k)$ can (but do not have to) be Cartesian coordinates. In some implementations, coordinates can be any curvilinear coordinates that appropriately identify the points in the point cloud (e.g., spherical, cylindrical, elliptic, polar coordinates, etc.).

In some implementations, segmentation can be performed by adding or removing points from hypothetical point clusters. For example, velocity data processing module 185 can identify an initial cluster populated with points having a velocity distribution that is consistent with a motion of a single rigid object. Velocity data processing module 185 can then verify whether the points outside the cluster (e.g., points that are near the current cluster boundary) fit the same distribution (e.g., are described by the same parameters $\vec{V}$, $\hat{\Omega}$ and/or $\vec{W}$). If the point fits the same distribution (e.g., within a target accuracy), the point can be included in the cluster and the cluster boundary can be shifted accordingly. In some implementations, the process can be performed in reverse, with velocity data processing module 185 starting with one or more larger clusters and verifying whether the points inside the cluster that are located close to the current boundary fit the same distribution of velocities as the rest of the cluster. If the point does not fit the distribution within a target accuracy, the point can be pruned or omitted from the cluster (and/or probed as belonging to another cluster). In some implementations, the two schemes (adding and pruning points) can be performed concurrently. In some implementations, lidar-assisted segmentation can further be augmented with additional information, such as reflected intensity, and so on. In some implementations, clusters can be superimposed over each other. For example, a smaller cluster corresponding to a passenger car can be surrounded by a larger cluster corresponding to a truck that is positioned behind the passenger car.

Figure 3A:
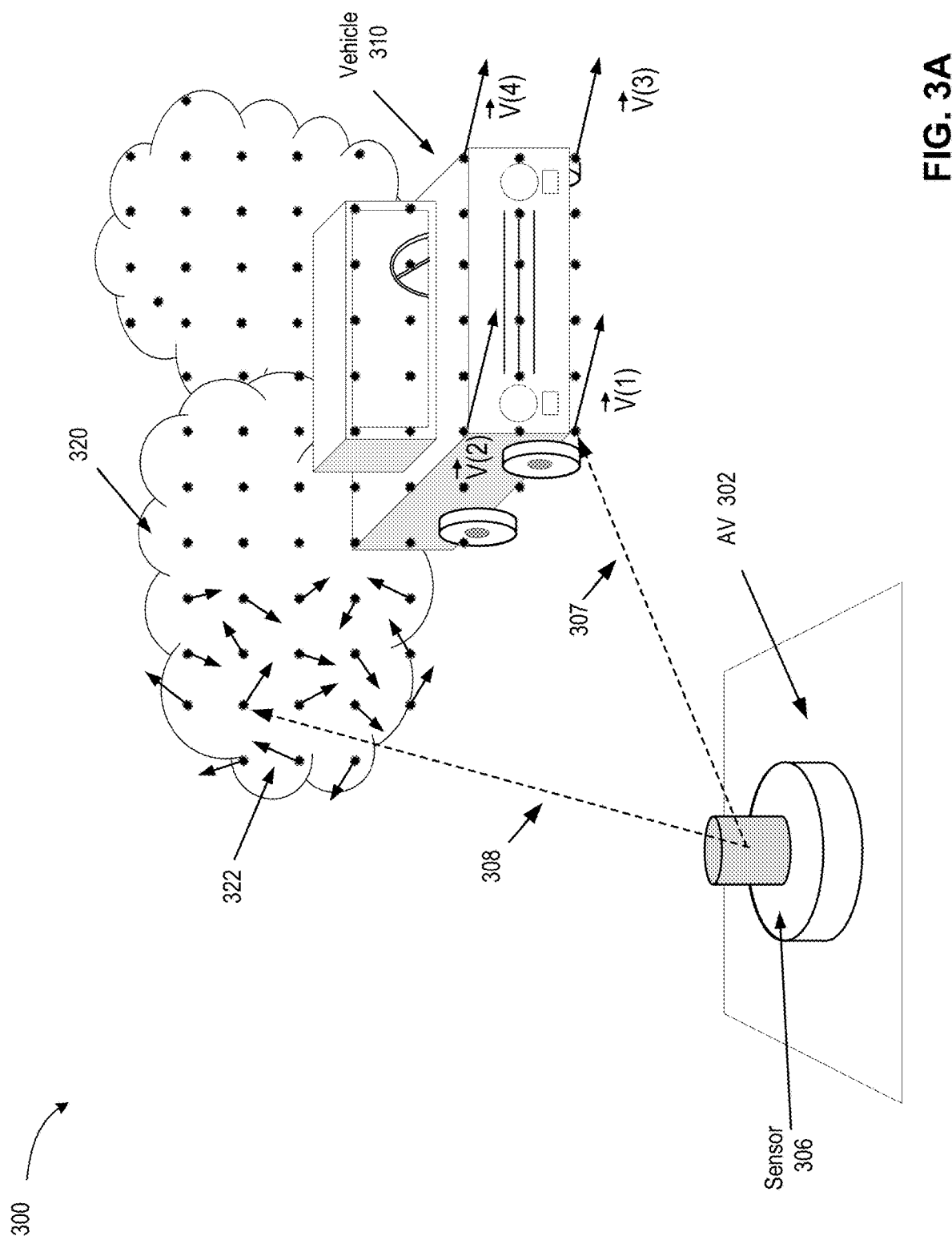
FIG. 3A is an illustration of a lidar-assisted segmentation for identification of particulate matter in autonomous driving applications, according to some implementations of the present disclosure.

FIG. 3A is an illustration 300 of a lidar-assisted segmentation for identification of particulate matter in autonomous driving applications, according to some implementations of the present disclosure. Depicted is a mesh of return points (black circles) rendered by sensing signals (e.g., signals 307 and 308) transmitted and received by sensor 306 of AV 302. For simplicity, the mesh of points is depicted as a square grid, but it should be understood that in reality different points are located at different distances from sensor 306 and that even points located at the same distance from sensor 306 can belong to a spherical—rather than the plane—field of view, even though spherical aberrations can sometimes be neglected (e.g., for points located sufficiently far from sensor 306) and the field of view can, therefore, be approximated by a plane.

The sensing field of view in FIG. 3A includes vehicle 310 and a cloud (of mist, snow, dust, on any other PM) 320, which can be lifted by wheels (or by air drag) of vehicle 310, or be part of a natural or artificial precipitation, etc. Vehicle 310 can perform a combination of a translational motion and a rotations motion (as depicted with velocities $\vec{V}(1)$, $\vec{V}(2)$, $\vec{V}(3)$, $\vec{V}(4)$) and can be represented as a rigid-body motion with sufficient accuracy, as described in detail above. Points that correspond to reflections from vehicle 310 can be amenable to rigid-body fitting with as many fitting parameters as permitted by the type of the motion expected in the respective driving environment (e.g., two horizontal components of the translational velocity and one vertical component of the rotational velocity, in case of a motion on a flat roadway). In contrast, various points generated by the particles of the cloud 320 have a more random distribution of radial velocities $\{V_r(j)\}$ (if detected by a single sensor 306) or vector velocities $\{\vec{V}(j)\}$ (if detected by multiple sensors, as described in more detail in reference to FIG. 4). Depicted is an example velocity distribution (shown with arrows) of a subset of points 322 (not to be understood as any actual distribution). Such a random distribution may not be amenable to a consistent fitting with the rigid-body body equation. More specifically, while it may be possible to fit a limited number (e.g., three of four) of arbitrarily chosen return points to a set of fitting parameters, $\vec{V}$, $\hat{\Omega}$, a different selection of the limited number of points would result in a different set of fitting parameters. Additionally, some of the fitting parameters can be inconsistent with the specifics of the driving environment, e.g., may require vertical components of velocity $\vec{V}$ and horizontal components of angular velocity $\hat{\Omega}$. Furthermore, as described above, velocity distribution $V_r$ of a vehicle 310 can be characterized by a fixed value of the velocity gradient $\vec{W} = \nabla V_r$ whereas gradients of the velocity distribution of cloud 320 can be characterized by random gradients $\vec{W}$ that vary between different points of cloud 320. Accordingly, based on differences of $V_r$ and/or $\vec{W}$, segmentation module 182 can identify points that belong to vehicle 310 and distinguish such points from points that belong to cloud 320.

Although shown as located behind vehicle 310, cloud 320 can in some instances be located in front of vehicle 310, or surround vehicle 310 from all sides. In such instances, a subset of points of cloud 320 can geometrically overlap (e.g., have coordinates belonging to overlapping regions) with the return points corresponding to vehicle 310. On some occasions, a single reflected signal can include Doppler shifts indicative of two (or more) velocities, when one part of the same laser beam reflects from particles of cloud 320 and another part of the beam reflects from a surface of vehicle 310. In such instances, points and velocity values that can be fit to a rigid-body equation can be given preference and used for rigid object identification whereas points indicative of a random motion that does not the rigid-body equation can be hypothesized as indications of the presence of particulate matter between the vehicle and sensor 306. Range data can additionally be used to confirm the hypothesis that particles of the cloud 320 are indeed located closer than the reflecting surfaces of vehicle 310. Whereas vehicle 310 is used as an illustration in FIG. 3A, it should be understood that the same implementations can be used for segmentation of to any other rigid objects (structures, road signs, signal lights, etc.) or semi-rigid objects (pedestrians, etc.) from particulate matter.

Figure 3B:
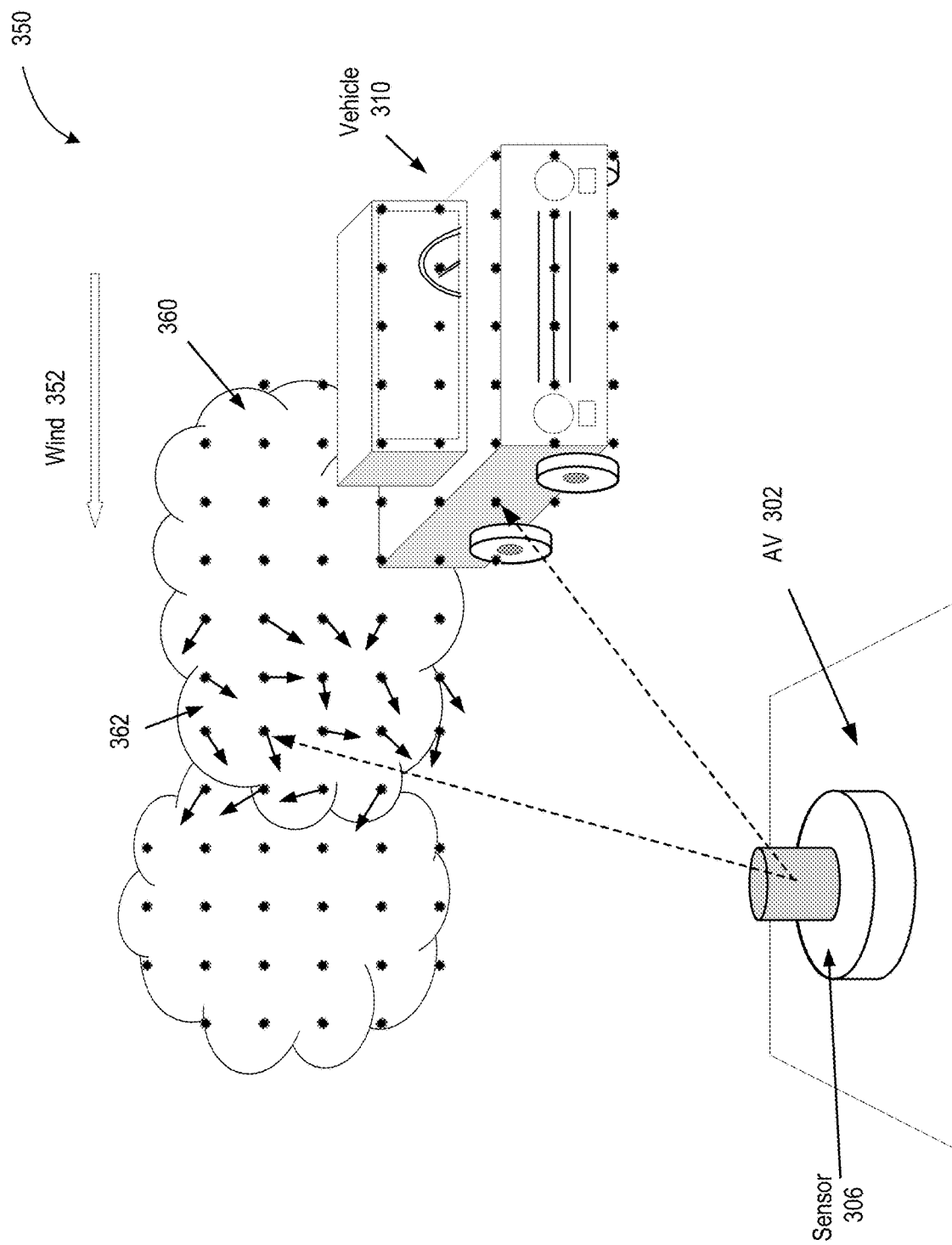
FIG. 3B is an illustration of a lidar-assisted wind identification in autonomous driving applications, according to some implementations of the present disclosure.

FIG. 3B is an illustration 350 of a lidar-assisted wind identification in autonomous driving applications, according to some implementations of the present disclosure. Wind 352 causes particles of cloud 360 of mist (or any other particulate matter) to acquire a net drift along the direction of wind velocity. To identify direction and speed of wind, PMI module 133 (e.g., PMI-S sub-module 133-1) can determine the average velocity of a cluster or N points in the cloud, $$\langle \vec{V} \rangle = \sum_{j=1}^{N} \vec{V}(j),$$

which can be associated with the wind velocity $\vec{V}_{wind} = \langle \rangle$. In some instances, to account for the difference between the wind speed and the associated with it drift of the particulate matter, an empirical correction $\alpha < 1$ can be introduced: $\alpha$ $\vec{V}_{wind} = \langle \vec{V} \rangle$. The empirical correction $\alpha$ can be determined by empirical testing and can be different for different types of particulate matter, such as mist, snow, dust, sand, etc. The empirical correction $\alpha$ can account for inertia of the particulate matter, which can result in the particulates having a drift speed that is less than the wind speed.

Figure 3C:
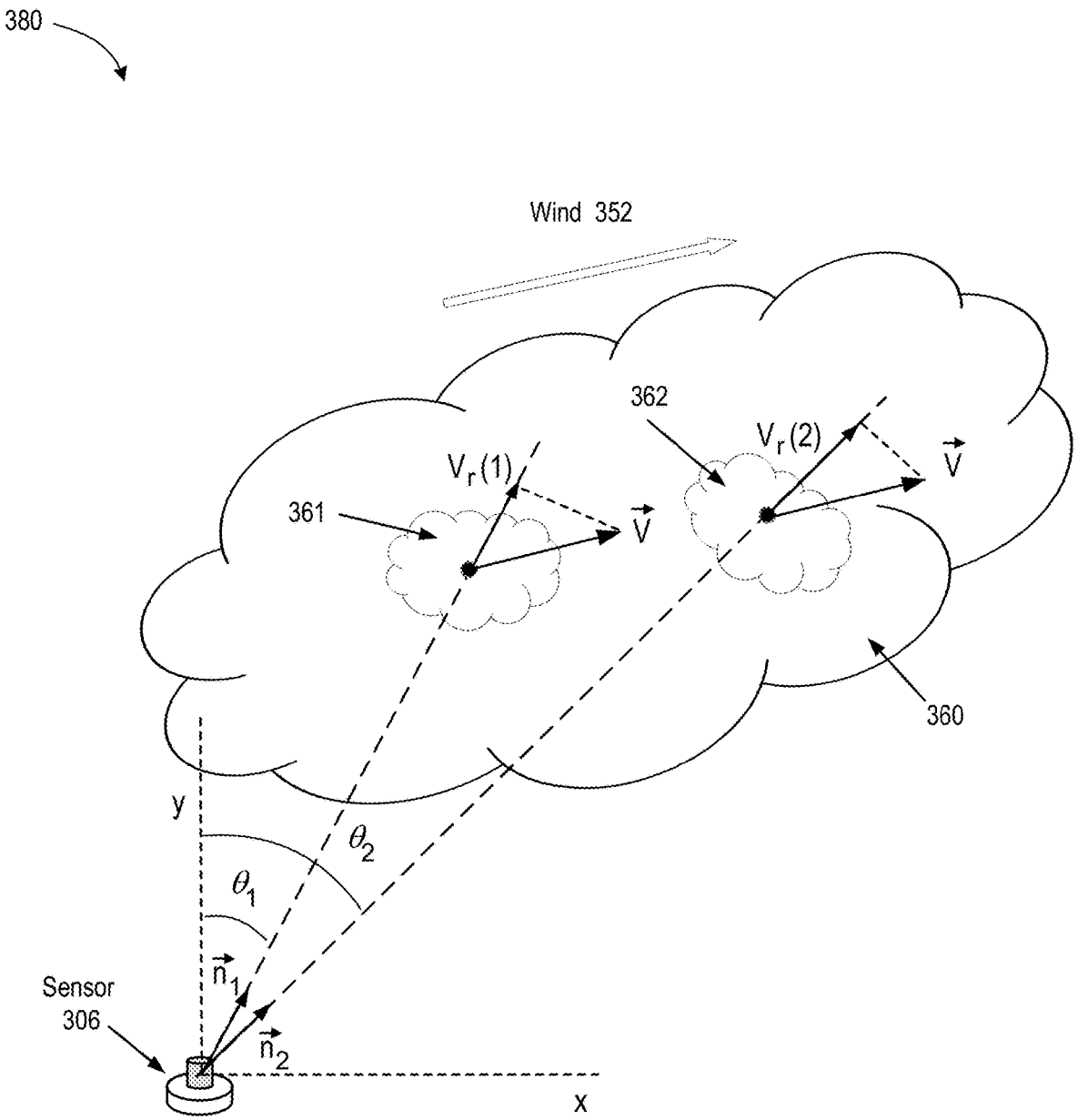
FIG. 3C is an illustration of a reverse triangulation setup for determination of vector velocity of wind using lidar-sensing technology, in accordance with some implementations of the present disclosure.

In some implementations, sensor 306 can be capable of detecting only the radial component of the velocity of various return points. To determine all components of the wind drift under such conditions, a method of reverse triangulation can be used. Reverse triangulation can be based on typically large extents of clouds of particulate matter (e.g., rain, mist, snow, etc.). FIG. 3C is an illustration of a reverse triangulation setup 380 for determination of vector velocity of wind using lidar-sensing technology, in accordance with some implementations of the present disclosure. Sensor 306 can collect velocity data for multiple return points (not shown) belonging to cloud 360. PMI-S sub-module 133-1 can subdivide cloud 360 into multiple sub-region (e.g., sub-regions 361 and 362) and determine average radial velocities for each sub-region, e.g., $V_r(1)$, $V_r(2)$ . . . . The sub-regions can have a form of a sphere, ellipsoid, cube, parallelepiped, cylinder, or any other appropriate object. Each sub-region can be sufficiently large to include many return points to average out random (disordered) part of the velocity of particulate matter. In some implementations, the sub-regions can be chosen (for additional accuracy) small enough to ensure that the directions from sensor 306 to various reflecting points within each sub-region vary not too significantly (e.g, within 10 degrees, 5 degrees, and the like). The center of each sub-region can be identified by a respective unit vector $\vec{n}_1, \vec{n}_2 \ldots$ along the direction from sensor 306 to the respective sub-region center, each unit vector making a known (from the coordinate sensing data) angle, $\theta_1, \theta_2 \ldots$, with some reference direction (e.g., y-axis, as shown). Accordingly, the radial component of the average drift velocity $\langle \vec{V} \rangle$ with respect to the radial direction can be known for each sub-region.

Expressing the relation $\langle \vec{V} \rangle \cdot \vec{n}_j = V_r(j)$ in components of the drift velocity $\langle V_x \rangle$ and $\langle V_y \rangle$ provides the followings system of linear equations (for a planar drift of the particulate matter):

$$\langle V_x \rangle \sin \theta_1 + \langle V_y \rangle \cos \theta_1 = V_r \quad (1),$$

$$\langle V_x \rangle \sin \theta_2 + \langle V_y \rangle \cos \theta_2 = V_r \quad (2),$$

A minimum of two equations can be required to determine both components $\langle V_x \rangle$ and $\langle V_y \rangle$ of the drift velocity $\langle \vec{V} \rangle$. For three or more sub-regions, the system of equations becomes overdetermined and methods of regression analysis (e.g., least square method) can be used for more accurate determination of the drift velocity. After the drift velocity $\langle \vec{V} \rangle$ of the particulate matter is determined, the wind velocity can be obtained using the empirical correction, $\vec{V}_{wind} = \alpha^{-1} \langle \vec{V} \rangle$. Although for brevity and conciseness, a two-dimensional reverse triangulation setup is illustrated in FIG. 3C, a similar setup can also be used to identify a three-dimensional drift velocity $\langle \vec{V} \rangle = (\langle V_x \rangle, \langle V_y \rangle, \langle V_z \rangle)$, with at least three equations needed to estimate all three components of the drift velocity.

In some implementations, instead of choosing sub-regions large enough so that the random component of the velocity of the particulate matter averages out, a separate equation $$V_x(j)\sin \theta_1 + V_y(j)\cos \theta_1 = V_r(j),$$

can be written individually (without averaging) for each reflecting point j. Even though each value $\vec{V}(j)$ may be different from the average drift velocity $\langle \vec{V} \rangle$, the solution of the over-constrained system of linear equations (j=1 . . . N) obtained using the least-squares method (or some other regression scheme) can be used as an approximation of the average drift velocity $\langle \vec{V} \rangle$, from which the wind velocity can be determined as described above.

Figure 4:
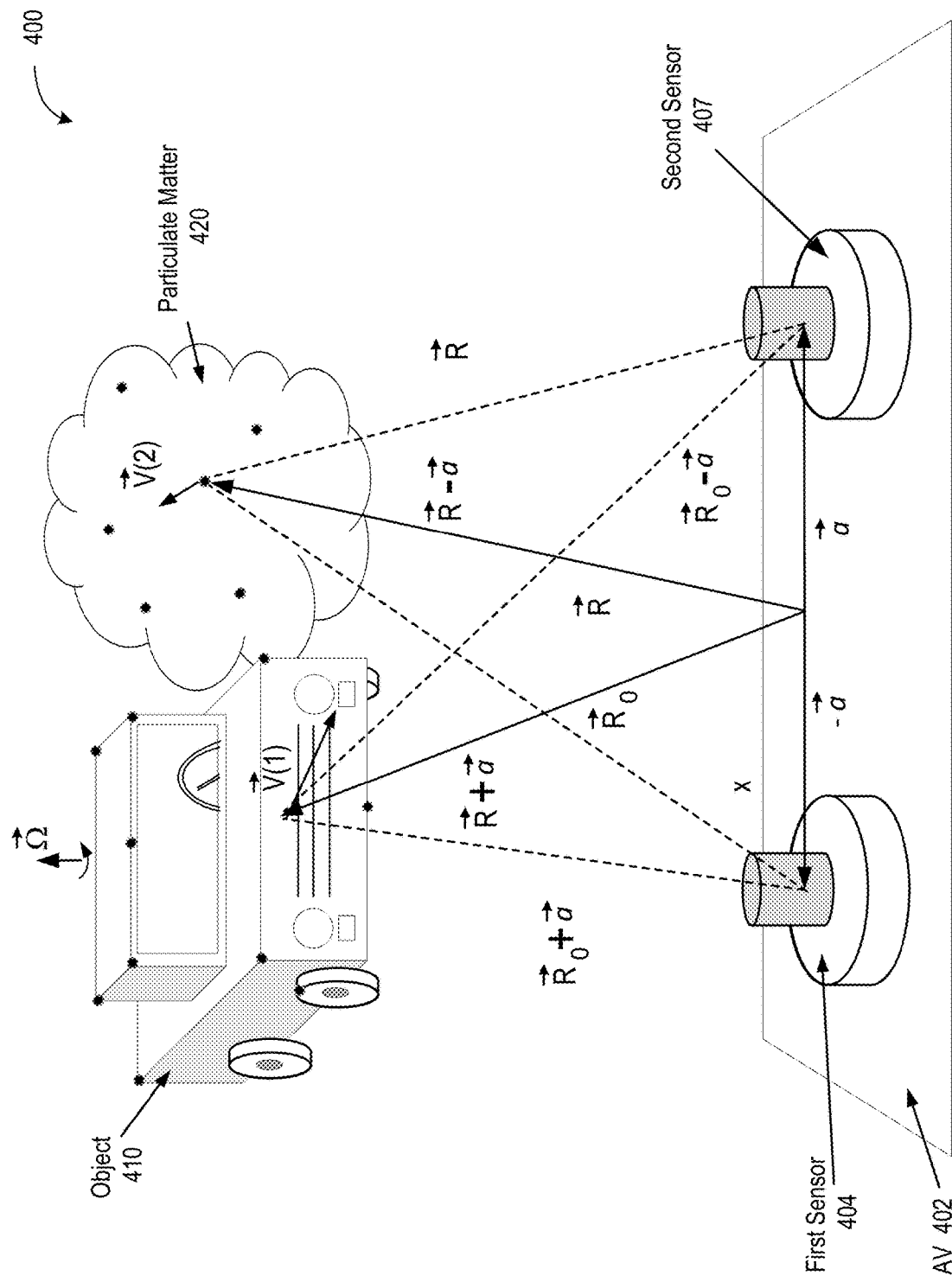
FIG. 4 is an illustration of a double sensor setup for identification of particulate matter in autonomous driving applications, in accordance with some implementations of the present disclosure.

In some implementations, the sensing system 120 can include more than one sensor, e.g., more than one coherent lidar, such as some lidar sensor(s) 122. In such implementations, multiple sensing frames can be obtained simultaneously (provided that frames of different sensors are synchronized). This can allow the perception system 132 to perform segmentation faster and more accurately than in case of a single-sensor system, even before subsequent sensing frames are obtained. FIG. 4 is an illustration of a double sensor setup 400 for identification of particulate matter in autonomous driving applications, in accordance with some implementations of the present disclosure. Depicted in FIG. 4 is AV 402 that has multiple coherent lidar sensors (two are shown for specificity), such as a first sensor 406 and a second sensor 407, which can be any type of a coherent (or a combination of a coherent and incoherent) lidar devices capable of sensing the distance to a reflecting surface and the radial velocity of the reflecting surface of an object in the driving environment. The sensors 406 and 407 can perform scanning of the driving environment and generate return points corresponding to various objects, such as vehicle 410 and particulate matter 420. Each sensor can output signals that have imparted phase signatures (e.g., chirps or any other phase or frequency modulation features) that are unique to the sensor, so that the return signals from different sensors do not interfere with each other. Sensors 406 and 407 can be located at some distance $2a$ (the baseline distance) from each other for improved lateral velocity resolution. In some implementations, the baseline distance can be made as large as practical (e.g., as limited by the length or width of AV 402). In some implementations, because lateral velocity resolution has a maximum in the direction perpendicular to the baseline and a minimum in the direction parallel to the baseline, more than two sensors can be utilized, e.g., placed in a non-collinear (e.g., triangular) arrangement. For example, a third sensor can be located near the front or back of the AV 402.

In some implementations, a processing logic of the sensing system (e.g., sensing system 120) can synchronize the sensing frames of sensor 406 and sensor 407 so that the sensing signals are output at the same instances of time, e.g., at $\tau, \tau+\Delta\tau, t+2\Delta\tau, \tau+3\Delta\tau$, etc. In other implementations, the sensor frames can be staggered (for example, to reduce possible interference or to improve temporal resolution) so that one sensor outputs signals at times $\tau, \tau+\Delta\tau, \tau+2\Delta\tau, \tau+3\Delta\tau$, whereas the other sensor outputs sensing signals at times $\tau+\Delta\tau/2, \tau+3\Delta\tau/2, \tau+5\Delta\tau/2$, and so on. Each sensor can obtain its respective return points which can be—due to different positioning and timing of the sensing frames—somewhat different from the return points of the other sensor(s) even at the same times. A processing logic of the perception system (e.g., perception system 132) can identify, for each return point $\vec{R}_1$ of the first sensor, the closest return point $\vec{R}_2$ of the second sensor and associate the two points with the same reflecting part of vehicle 410 (or any other rigid object). In some implementations, the processing logic can approximate that the reflecting part is located at the halfway point, $(\vec{R}_1+\vec{R}_2)/2$.

The motion of vehicle 410 can be described by the rigid body equation, which can be projected separately onto the direction of view of the first sensor 406, $\vec{R}+\vec{a}$, and the direction of view of the second sensor 407, $\vec{R}-\vec{a}$. The two respective radial velocities (with the +sign corresponding to the direction from the first sensor and the − sign corresponding to the direction from the second sensor) are $$V_{r\pm} = \vec{V}_O \cdot \frac{\vec{R}_\pm}{R_\pm} + (\vec{R}_{O\pm} \times \vec{\Omega}) \cdot \frac{\vec{R}_\pm}{R_\pm},$$

where $\vec{R}_\pm = \vec{R} \pm \vec{a}$, $R_\pm = |\vec{R} \pm \vec{a}|$, and $\vec{R}_{O\pm} = \vec{R}_O \pm \vec{a}$. Because for each point there are two radial velocity equations, three points can potentially determine all six components of the translational and the angular velocities of the object 410. Since the two radial directions are different from each other, lateral velocity of the rigid object can be determined based on a single reference frame, in some implementations. If multiple points are available per moving rigid object, methods of statistical analysis can be used for improving accuracy of segmentation, as described above. Likewise, knowledge of additional components of velocity of particulates can be used for more precise segmentation of particulate matter from rigid objects.

In some implementations, segmentation into particulate matter and solid (rigid) objects can be performed based on various methods of clustering, such as K-means clustering. For example, clustering can be performed by associating each data point j with a vector in a multi-dimensional feature space, such as a four-dimensional space that includes three spatial dimensions (two spatial dimensions in the instances of objects moving on a surface), $\hat{X}_j^T = (x_j, y_j, r_j, V_{rj})$, and then further associating the point with a k-th cluster of K clusters ($1 \leq k \leq K$) that are hypothesized to be present within the point cloud. A k-th cluster may have a centroid located at some point in the multidimensional space, $\hat{X}_k^T = (x_k, y_k, r_k, V_{rk})$. Both the locations of the centroids as well as the number of clusters K can be fitting parameters of the segmentation procedure that can be changed during iterative clustering (which amounts to assigning and reassigning points to clusters with increasing accuracy). A measure of how confidently j-th point belongs to k-th cluster can be a Euclidean distance parameter, such as $$D_{jk} = a(x_j - x_k)^2 + b(y_j - y_k)^2 + c(r_j - r_k)^2 + d(V_{ir} - V_{kr})^2$$

with coefficients a, b, c, d determining how much weight is assigned to a distance from the respective centroid along a particular dimension. The numerical values of the coefficients can be selected empirically, based on testing performed on actual point clouds that have been segmented by a developer or by automatic methods of segmentation, including object recognition from images taken by camera (e.g., contemporaneously, using camera that is synchronized with the sensing system). Segmentation into clusters can be performed iteratively. Each iteration can include: 1) assigning various points into clusters based on current location of the clusters' centroids (or based on other reference points or known metrics), and 2) re-computing locations of the centroids (or other reference points/metrics) based on the current assignment of points to clusters. Such iterations can be performed until the procedure converges to a target accuracy or if further iterations do not change the obtained assignment of points to current clusters.

In some implementations, not every point is to be associated with clusters. Those points whose distances to centroids of the (currently) identified clusters exceed a threshold distance (in the feature space) can remain unassociated from any of the clusters and can represent points that are associated with the particulate matter. Because particulate matter can be (and often is) located quite close to rigid objects (or even overlap with such objects), while having velocities that are significantly different from the velocities of the rigid objects, a greater weight in computing the distances $D_{jk}$ can be given to velocity differences than to coordinate differences.

Once all return points are classified among one of the clusters (rigid objects) or as unassociated points (particulate matter), different regions (directions) of space can be identified as including rigid objects (possibly, in combination with the particulate matter) or as having only the particulate matter. Those regions that only have the particulate matter can be identified by perception system 132 as regions that are safe to drive through. The information about safe regions can be provided to the AVCS 140, and the AVCS 140 can use this information in making driving decisions for the AV.

In some implementations, techniques of adding and pruning (described above in relation to velocity gradient-based segmentation methods) can similarly be used in K-means clustering. For example, once cluster centroids are identified with sufficient accuracy based on smaller clusters, more points can be added to the identified clusters based on the distances to the identified centroids. Centroids can remain fixed or can be adjusted when new points are added. In some implementations, some points can be omitted (pruned) from clusters; points that are subject to pruning can be outlier points, points located near the current boundary of the clusters, points that preclude the iterative procedure from converging, and so on.

In the above example, K-means clustering algorithm is based on distances in a space of dimensions that represent raw data (coordinates and radial velocity). In other implementations, some of the dimensions can correspond to various processed values, such as the lateral velocity values measured by additional sensors (e.g., second sensor 407 in FIG. 4) or computed based on the rigid-body equation. For example, at each iteration, for each or some of the current clusters, a best fit computation can identify translational velocity $\vec{V}$ and angular velocity $\vec{\Omega}$ (e.g., using least squares method) based on points already assigned to the cluster(s).

Subsequently, based on the identified $\vec{V}$ and $\vec{\Omega}$, one or more lateral velocities can be determined for some or all points in the current cluster(s). The determined (or measured) lateral components can then be used as additional dimensions in the augmented space of vectors $\hat{X}_j^T = (x_j, y_j, r_j, V_{xj}, V_{yj}, V_{rj})$, with the distances to the cluster centroids determined in the augmented space as described above, with additional distances associated with the dimensions $V_x$ and $V_x$. After reassigning points to clusters based on the computed distances, another iteration can performed, starting with identifying the updated translational velocity $\vec{V}$ and the angular velocity $\vec{\Omega}$, and so on, until the iterative procedure converges. In some implementations, other parameters can be included (e.g., as additional dimensions of the space of vectors) to further facilitate segmentation and enable classification of the particulate matter. For example, intensity of the reflected signal can be used as such an additional dimension, since different objects are likely to have at least somewhat different reflectivities (caused by different materials, paint, quality of surfaces, etc.). The intensity data can be used by PMI-C sub-module 133-2 to classify particulate matter among various types, known to PMI-C sub-module 133-2, such as mist (water), snow, dust, sand, oil spray, smoke, vehicle exhaust, and the like.

In some implementations, parameters characterizing the intensity and/or frequency profiles of the reflected signals can be used as additional dimensions of the augmented space. For example, as described below in relation to FIGS. 5A and 5B. reflection from multiple regions of the particular matter can cause the reflected signal to have an extended (elongated) intensity profile. Additionally, because the multiple regions, from which the returned signal is reflected, can have different velocities, the reflected signal can be characterized by a broadened Doppler shift characterized by a distribution of the Doppler shifts $\Delta=2fV_r/c$ resulting from a distribution of radial velocities $V_r$ of the reflecting region. This Doppler shift broadening can be used to distinguish reflections generated by a particulate matter from reflections generated by rigid targets.

In some implementations, the number of clusters K can be determined concurrently with the performance of the segmentation operation. More specifically, segmentation can be performed, alternatively, into schemes with K−1, K, K+1 . . . , etc., clusters, with various measures used to determine which segmentation scheme is to be selected, such as an elbow point method, Akaike criterion, cross-validation methods, information criteria, information theoretic jump method, silhouette methods, G-means algorithms, and so on. Although, the K-means clustering is described above, as a way of example, in some implementations, other methods of clustering augmented with velocity information, can be used instead, such as mean-shift clustering, density-based clustering, expectation—maximization clustering, hierarchical clustering, and the like.

A Gaussian Mixture Model (GMM) can be used for segmentation, in some implementations. More specifically, various points in the point cloud {P} can be distributed across (hypothesized) clusters $\{P_1\}$, $\{P_2\}$, . . . $\{P_M\}$. For each cluster $\{P_m\}$, a mean vector value $\hat{E}(m)$ of all vectors $\hat{X}$ associated with points belonging to the respective cluster can be determined together with the covariance matrix $\widehat{Cov}$ (m). For each point $\hat{X}$ that is hypothesized to belong to cluster m (or already classified as belonging to this cluster), the Mahalanobis distance can be computed from the respective distribution (cluster), e.g., $D_m(\hat{X})=[\hat{X}-[\hat{X}-\hat{E}(m)]^T \widehat{Cov}$ (m)$[\hat{X}-\hat{E}(m)]$. Subsequently, classification of the point $\hat{X}$ can be performed based on the determined Mahalanobis distances, e.g., by associating the point $\hat{X}$ with the cluster whose Mahalanobis distance to the point $\hat{X}$ is the smallest. Similar to the K-means clustering, GMM clustering can be performed in an iterative manner, with various clusters parameters (means, covariances, etc.) and distances to various points recomputed as more points are added to different clusters or transferred between clusters (following iterative changes to the cluster parameters).

Figure 5A:
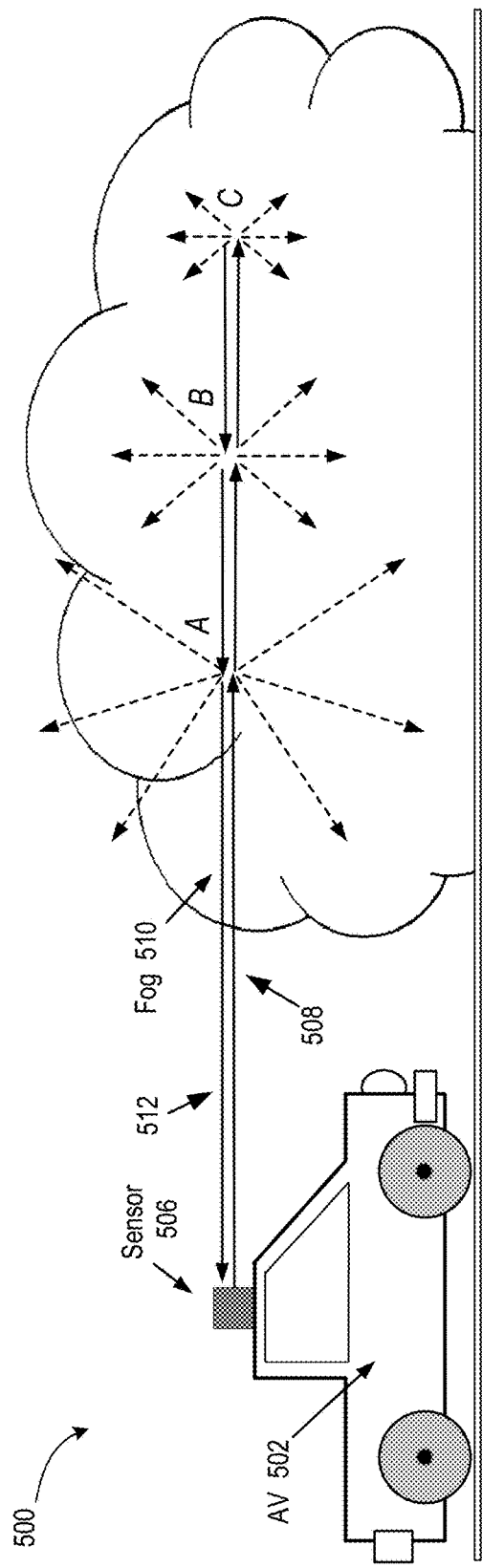
FIG. 5A is an illustration of a lidar-assisted determination of visibility in the presence of a particulate matter in autonomous driving applications, according to some implementations of the present disclosure.

FIG. 5A is an illustration 500 of a lidar-assisted determination of visibility in the presence of a particulate matter in autonomous driving applications, according to some implementations of the present disclosure. Safety and performance of AVs in reduced visibility conditions caused by particulate matter (e.g., fog, snowstorm, sandstorm, and the like) can be improved if accurate estimates of an amount of particulates in the environment can be made by the AV's sensing system. Reliance on processing of images of the environment captured by camera(s) may not always provide such a reliable estimate, and an availability of an independent mechanism of estimating current visibility is always beneficial. To enable such an estimate, a sensing system of the AV can detect attenuation and temporal elongation of the reflected signal that undergoes interaction with the particulate matter. In one implementation, sensor 506 of AV 502 can emit one or more sensing signals 508 that propagate in fog 510 (or some other PM) and, upon reflection from various particulates (points A, B, C, etc.) of the fog generate multiple reflected beams that are detected by sensor 506 in the form of an elongated signal. In some implementations, sensing signal 508 can be output by a coherent lidar (e.g., FMCW). As depicted schematically with dashed lines, at each point along the line of propagation, signal 508 attenuates from scattering by particulates (e.g., small droplets of water suspended in air). As a result, the reflected signal 512 detected by sensor 506 possesses at least two modifications compared with a similar signal that propagates through clean air and reflects from a solid target. Firstly, the intensity of the reflected signal 512 is attenuated to a degree that is dependent on (e.g., proportional to) the amount (e.g., density) of the particulate matter. Secondly, because of multiple reflections along the signal propagation, the temporal spread of the reflected intensity $I_R(t)$ is larger than the spread of the output intensity $I_0(t)$ (assuming that the transmitted signal is a pulse, a wave packet, or any other signal having a finite duration).

The intensity of the output beam decreases (as a result of attenuation) with distance x travelled in the fog as $I_0(\tau)e^{-\beta x}$, where $I_0(\tau)$ is the intensity of the emitted signal at the time of emission $\tau$ and $\beta$ is the extinction coefficient, which can depend (e.g., linearly) on the fog density. The probability that the output beam will be scattered over interval of distances dx is $\beta dx$. (In some implementations, the probability can be less than $\beta dx$, if extinction of the beam results from both scattering and absorption.) The extinction coefficient $\beta$ can depend on the wavelength of light (e.g., in case of Rayleigh scattering off the particles of fog, $\beta$ can be depend on the wavelength $\lambda$ as, $\beta \propto \lambda^{-4}$), distribution over the size of the particles, density of the particles, type of particles (e.g., fog, snow, dust, smoke, etc.), and so on. The return path—from the scattering particle at location x back to sensor 506—causes the intensity of the reflected signal to attenuate further by another factor $e^{-\beta x}$. Additionally, for diffuse reflection from the particles of the fog, the reflected intensity is reduced by a factor $\alpha/(4\pi x^2)$, since the reflected (scattered) signal propagates in the form of a spherical wave. Parameter a can be of the order of the area of the receiving orifice of sensor 506, although the precise value a can be different from the orifice area, e.g., when scattering from particles of fog (or any other particulate matter) is not fully isotropic. In some implementations, parameter a can be used as a fitting parameter, e.g., being determined by empirical testing. Parameter a can further include a measure of how much light is lost (e.g., dispersed in various directions, absorbed, etc.), such as the ratio of the backscattered light to the amount of light lost (the so-called "lidar ratio"). Furthermore, noticing that the location x where signal 506 experiences reflection (scattering) is related to the time of emission $\tau$ and time of detection t according to $x=c(t-\tau)/2$, and summing (integrating) over all locations of possible reflection along the line of the signal propagation, the intensity of the reflected signal can be represented as, $$I_R(t) = \frac{a\beta}{2\pi c} \int_{-\infty}^{t-\Delta T} \frac{d\tau}{(t-\tau)^2} I_0(\tau)\exp(-\beta c(t-\tau)).$$

Figure 5B:
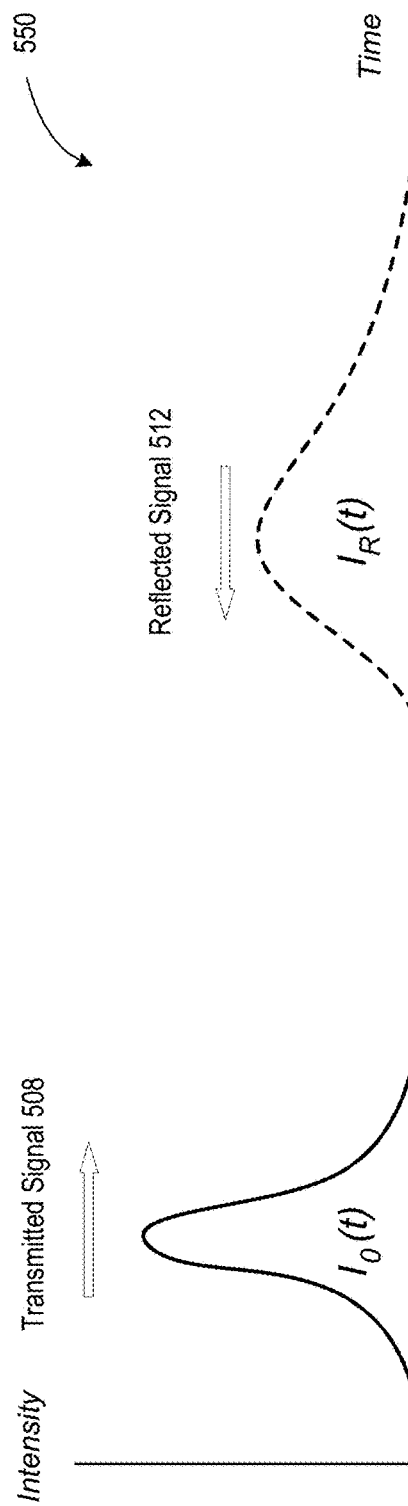
FIG. 5B illustrates pulse elongation of a lidar signal reflected from particulate matter.

The cut-off time ΔT can be, optionally, set (optically or electronically, using signal processing circuitry) to eliminate strong backscattering signal generated by reflections that are caused by the near particles. Based on the known intensity spread $I_0(\tau)$ of the output signal, the extinction coefficient β can be determined by fitting the intensity spread (pulse elongation) of the reflected signal $I_R(t)$ using the above formula. Based on the determined extinction coefficient and known specification of the sensing system 120, the perception system 132 can determine the maximum visibility range of the lidar(s), radar(s), cameras, etc., of the AV. For example, without particulate matter, the returned signal reflected from a solid target at distance L can have intensity $I_R = R(L)I_0$ reduced from the intensity $I_0$ of the output signal by a reduction factor R(L) that can depend on the distance as well as the type and quality of the reflecting surface (e.g., for a diffusively reflecting surface the reduction factor can depend inversely proportional to the square of the distance L). Because in the presence of the particulate matter, the signal reflected from the same target can be additionally attenuated by the factor $e^{-2\beta L}$, the maximum visibility range $L_{max}$ can be determined from solving the equation $I_{min} = R(L_{max})I_0 e^{-2\beta L_{max}}$, where $I_{min}$ is the minimum intensity of the reflected signal (which can be a lidar signal or a radar signal) that can still be detected by the sensing system of the AV. Using this (or a similar equation), the processing system of the AV can determine the maximum visibility range for various types of targets, such as road vehicles, pedestrians, road signs, signs, buildings and structures, and so on (with each type of the target described by different—stored in memory—functions R(L)). Similarly, maximum visibility range can be determined for camera(s) of the AV, e.g., by approximating that the amount of light registered by the camera(s) is reduced by the factor $e^{-\beta L}$ (rather than by $e^{-2\beta L}$ for lidar/radar). In addition to determining the maximum visibility range for various sensing devices of the AV, the perception system 132 can also identify the type of the particular matter (e.g., fog, snow, smoke, dust, etc.) based on the value of the determined extinction coefficient. FIG. 5B illustrates pulse elongation 550 of a lidar signal reflected from particulate matter. The above formula and illustration in FIG. 5B are intended to be illustrative. Other formulas can be used in various implementations, which can take into account additional effects neglected herein, e.g., effects of light absorption, polarization, coherence, and the like. In some implementations, particles of fog can be modeled as Mie particles.

Figure 6:
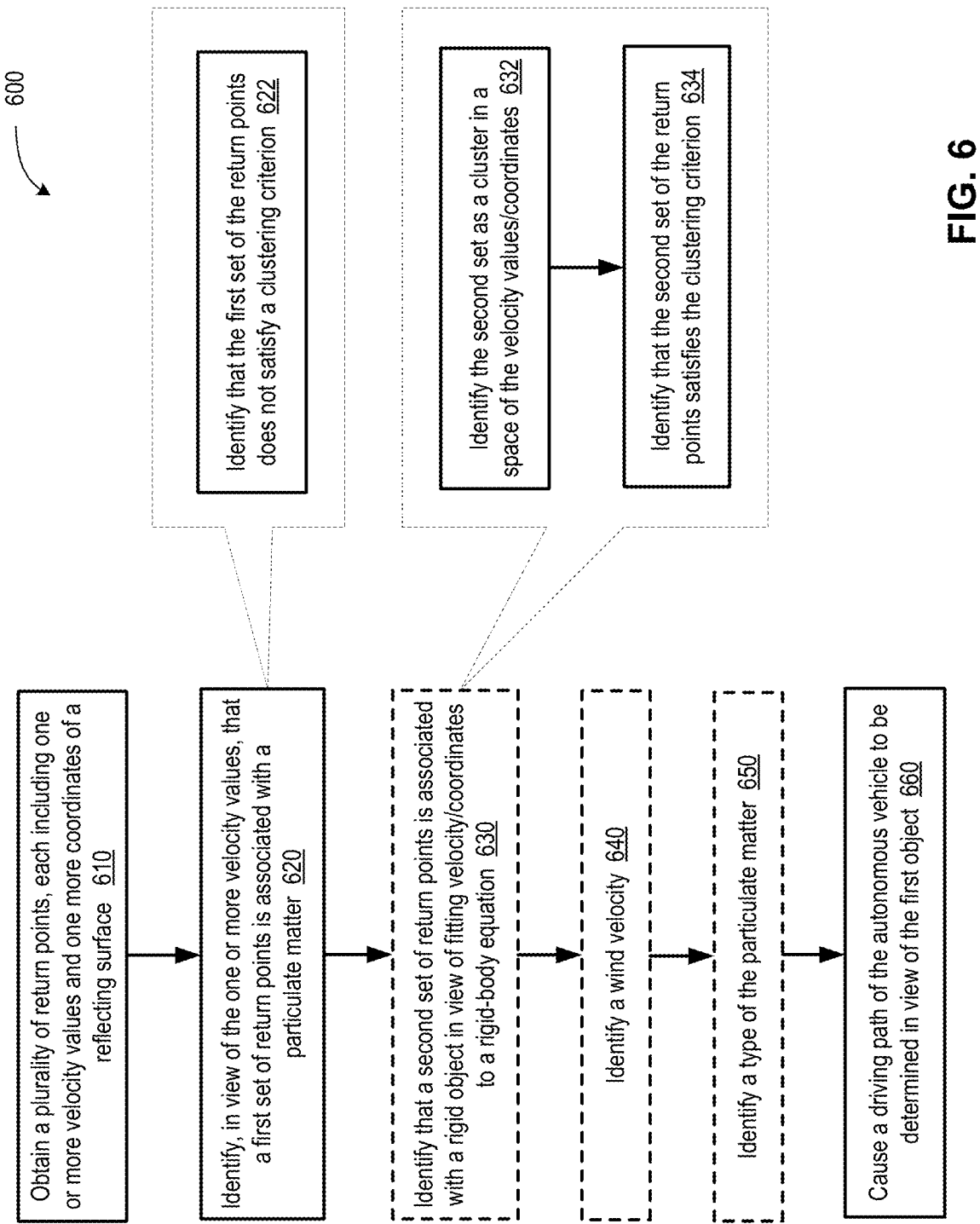
FIG. 6 depicts a flow diagram of an example method of a lidar-assisted identification and classification of particulate matter in autonomous driving applications, in accordance to some implementations of the present disclosure.

FIG. 6 depicts a flow diagram of an example method 600 of a lidar-assisted identification and classification of particulate matter in autonomous driving applications, in accordance to some implementations of the present disclosure. Method 600, as well as method 700 described below, and/or each of their individual functions, routines, subroutines, or operations can be performed by a processing device, having one or more processing units (CPU) and memory devices communicatively coupled to the CPU(s). The processing device executing methods 600 and 700 can perform instructions from various components of the perception system 132, e.g., PMI module 133 (and/or PMI-S sub-module 133-1 and PMI-C sub-module 133-2). In certain implementations, methods 600 and 700 can be performed by a single processing thread. Alternatively, methods 600 and 700 can be performed by two or more processing threads, each thread executing one or more individual functions, routines, subroutines, or operations of the method. In an illustrative example, the processing threads implementing methods 600 and 700 can be synchronized (e.g., using semaphores, critical sections, and/or other thread synchronization mechanisms). Alternatively, the processing threads implementing methods 600 and 700 can be executed asynchronously with respect to each other. Various operations of methods 600 and 700 can be performed in a different order compared with the order shown in FIGS. 6 and 7. Some operations of the methods can be performed concurrently with other operations. Some operations can be optional (as indicated by dashed boxes) in FIGS. 6 and 7.

Method 600 can be directed to systems and components of an autonomous driving vehicle, such as the autonomous vehicle 100 of FIG. 1A. Method 600 can be used to improve performance of the autonomous vehicle data processing system 130 and/or the autonomous vehicle control system 140. At block 610, method 600 can include obtaining, by a sensing system of an autonomous vehicle (AV), a plurality of return points, each return point comprising one or more velocity values and two or more coordinates of a reflecting region that reflects a signal emitted by the sensing system. Obtaining return points can include some or all of the following. One or more sensors (e.g., lidar, FMCW, hybrid ToF/coherent lidar, and so on) of the sensing system of the AV can emit a series of signals (e.g., optical signals). The signals can be emitted in a periodic (cyclic) pattern, e.g. by rotating, pivoting or otherwise scanning transmitters or transmitted beams (e.g., through beam steering, etc.), in various directions, e.g., forming the 360-degree panoramic pattern. The signals can strike various objects (moving or stationary) and reflect back towards the sensor from various reflecting regions of the objects. The number of reflecting regions can vary depending on the nature, size of the object, the object's level of occlusion by other objects. The intensity of the reflected signals can depend on the kind (material, surface type, etc.) of the reflecting region, the wavelength of the signal, polarization, etc. Based on the characteristics and timing of the reflected signals, the sensing system of the AV can generate (render) a plurality of return points. The return points are data entries that are associated with a reflection of one of the emitted signals from an object of the environment. The return points can be generated in real time. Each return point can include various data entries, such as a timestamp of a cycle of the sensor, intensity of the returned signals, polarization of the returned signals. Each return point can include two or more coordinates of the respective reflecting region. For example, the coordinates can be a distance to the reflecting region (e.g., determined from the time of flight of the returned signals), and one or more directional angles, such as the azimuthal angle specifying direction within the horizontal plane and the polar angle specifying the elevation above (or below) the horizontal plane. Each return point can further include a velocity value; the velocity value can represent the radial component of the velocity of the reflecting region with respect to the radial direction from a transmitter of the sensing system towards the reflecting region.

The sensor can be a coherent light detection and ranging device (lidar) capable of detecting the radial velocity using, e.g., Doppler-assisted sensing. In some implementations, the coherent lidar can be a frequency-modulated continuous-wave lidar and the signals emitted by the sensor can include phase-modulated or frequency-modulated electromagnetic waves. The sensor can also be capable of concurrently emitting various other signals, such as pulsed signals, which can be used for ToF distance measurements. In some embodiments, the sensor can include separate ToF lidar and a coherent lidar, each emitting separate signals that can be synchronized, mixed, and transmitted along the same optical paths. The return points can belong to (e.g., be associated with) various sensing frames corresponding to different scanning cycles of the transmitter(s) of the sensing system. The terms "first" and "second" should be understood as identifiers only and should not presuppose a specific order.

At block 620, method 600 can continue with a processing device (e.g., a device executing software instructions issued by PMI module 133 as part of the perception system 132) identifying, in view of the one or more velocity values of each of a first set of the return points of the plurality of return points, that the first set of the return points is associated with a particulate matter in an environment of the AV. For example, identifying that the first set of the return points as associated with the particulate matter can include identifying that the one or more velocity values of the first set of the return points represent a disordered distribution of velocities, e.g., a distribution that does not fit a rigid-body equation. In some implementations, method 600 can continue, at optional block 630, with the processing device identifying, in view of the one or more velocity values of a second set of the return points of the plurality of return points, that the second set of the return points is associated with a rigid object in the environment of the AV. For example, identifying that the second set of the return points is associated with the rigid object (e.g., a moving or parked vehicle, a pedestrian, a road sign, a tree, a building or any other structure, etc.) can include identifying that the one or more velocity values of the second set of the return points fits a rigid-body equation within a predetermined accuracy (which can be set in view of the accuracy of the lidar-sensing technology). In some implementations, as indicated by optional blocks 622, 632, and 633 of the blowout sections in FIG. 6, methods of clustering can be used to identify the first set of points as corresponding to a particulate matter and the second set of points as corresponding to a rigid object.

Clustering can be performed (e.g., by the perception system) in a multi-dimensional feature space whose dimensions include the obtained one or more velocity values and the one or more coordinates. More specifically, identifying clusters in the multi-dimensional feature space can include applying a clustering criterion to the return points. In one example, applying the clustering criterion can include computing distances from the return points to reference points (e.g., centroids, in one implementation) of multiple clusters and determining that the distance from a specific return point to a reference point of a particular cluster is smaller than the distances to reference points of other clusters. The clustering criterion can include an upper limit on the distance from return points to various clusters' reference points with points that are too far away from the reference points being classified as unassociated with any of the clusters (or classified as a separate "unassociated" cluster). Accordingly, as indicated by block 622, method 600 may identify that the first set is associated with the particulate matter by determining that the first set of the return points does not satisfy the clustering criterion (or belongs to the one of the "unassociated" clusters).

Similarly, at optional block 632, method 600 can continue with the processing device identifying the second set of the return points as a cluster in the multi-dimensional feature space, identifying, at optional block 634, that the second set of the return points satisfies the clustering criterion. The second set of points can be identified as part of a hypothesis that the points in the second set correspond to a single object. In some implementations, identifying that the second set of the return points is associated with the rigid object includes fitting the one or more velocity values and the one or more coordinates of each of the second set of the return points to the rigid-body equation. A motion of such a body can be described with six parameters (or fewer than six parameters, in cases of a geometrically restricted motion, such as a two-dimensional motion). The six parameters can be (1) the three components of the object's translational velocity $\vec{V}$, and (2) the three components of the object's rotational (angular) velocity $\vec{\Omega}$. In some implementations, additional parameters can include coordinates of a center of rotation with respect to which the translational velocity is specified.

Fitting the one or more velocity values (e.g., a first radial velocity measured by a first sensor and/or a second radial velocity measured by a second sensor) and the one or more coordinates of each return point of the second set can include predicting the radial velocity value(s) based on the coordinates of the return points and the fitting parameters (e.g., $\vec{V}$ and $\vec{\Omega}$) using the rigid body equation and comparing to the measured radial velocity values (e.g., $V_r$ if one sensor is being used, or $V_{r+}$ and/or $V_{r-}$, if two sensors are being used, and so on). A fitting error can then be determined for various points of the second set of the return points. The fitting error can be a mean squared error, a median squared error, a maximum squared error, or any other function (e.g., a statistical measure) characterizing the error between the predicted velocities and the measured velocities. If the computed fitting error is greater than a target error, the hypothesis can be invalidated. If the computed fitting error is smaller than the target error, the hypothesis can be accepted (in some implementations, subject to further verification, e.g., using additional sensing frames).

At optional block 640, method 600 can continue with the processing device identifying, using the one or more velocity values of the first set of the return points, a wind velocity. For example, the processing device can determine that the disordered distribution of the velocities of the first set of the return points includes a net drift of the particulates in some direction and with some speed. The net drift can be determined using methods of reverse triangulation in conjunction with sensing data from a single lidar sensor (as disclosed in more detail in relation to FIG. 3C), and/or methods of direct triangulation in conjunction with sensing data from multiple lidar sensors (as disclosed in more detail in relation to FIG. 4), or a combination of methods thereof.

At optional block 650, method 600 can include identifying a type of the particulate matter. More specifically, return points can further include an intensity value representative of the strength of the reflected signal, e.g., an amplitude of the reflected signal, a power of the reflected signal, a total energy carried by the reflected signal (if the signal is a pulse or a wave packet). Based on the intensity value of the reflected signal and the stored reference intensities, PMI module 133 (and/or PMI-C sub-module 133-2), can identify, in view of the intensity value for at least some of the first set of the return points, a type of the particulate matter, which can one of mist, snow, dust, smoke, sand, or the like.

At block 660, method 600 can continue with the processing device causing a driving path of the AV to be determined in view of the of the identified particulate matter motion and, optionally, in view of the identified rigid object. For example, the perception system can identify the first set of the return points as corresponding to a first region of space that is occupied with the particulate matter only and thus safe to drive through. The perception system can also identify the second set of the return points as corresponding to a second region of space that is occupied by the rigid object and thus to be avoided. The perception system can communicate this information to the control system (e.g., the AVCS 140). The control system can chart a driving path that avoids the rigid object and goes through the particulate matter. The control system can determine a new path for the AV, which can include braking, changing lanes, stopping, backing up and so on. The control system can subsequently output instructions to powertrain and steering 150, vehicle electronics 160, signaling 170, etc., to ensure that the AV follows the determined driving path.

Figure 7:
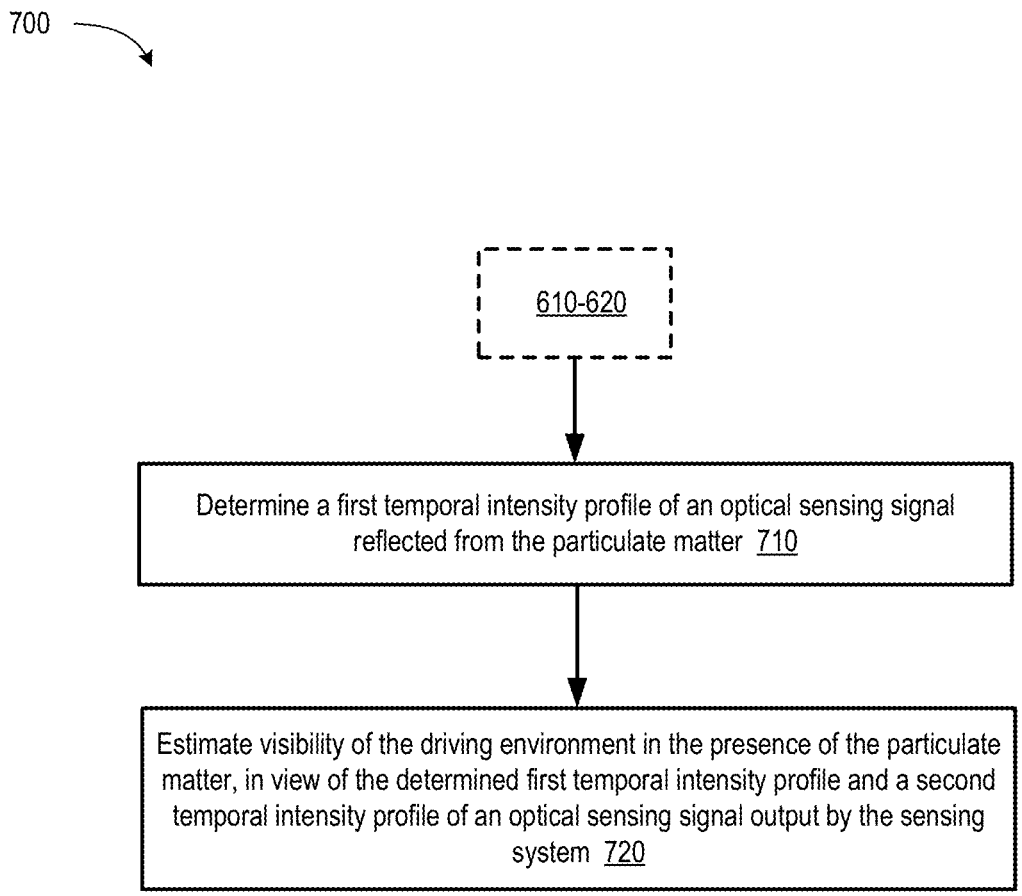
FIG. 7 depicts a flow diagram of an example method of lidar-assisted determination of visibility in the presence of a particulate matter in autonomous driving vehicle applications, in accordance with some implementations of the present disclosure.

FIG. 7 depicts a flow diagram of an example method 700 of lidar-assisted determination of visibility in the presence of a particulate matter in autonomous driving vehicle applications, in accordance with some implementations of the present disclosure. Method 700 can be performed in conjunction with blocks 610 and 620 of method 600 of lidar-assisted identification and classification of particulate matter. More specifically, the sensing system of the AV can output a plurality of sensing signals, detect the respective reflected beams, and render a plurality of points for the perception system of the AV. The perception system of the AV can process the plurality of points to detect the presence of a particulate matter (e.g., fog). The perception system can then send a request to the sensing system for additional testing to determine the current visibility of the environment. The sensing system can prepare a visibility-sensing signal and output the prepared signal in the direction of the particulate matter. In some implementations, the visibility-sensing signal can be output towards regions of space where no other objects (e.g., vehicles, structures, pedestrians, road signs, and the like) have been detected, to avoid contamination of the reflected signal with reflections from spurious surfaces. The visibility-sensing signal can be different from signals that are output by the sensing system in the course of scanning of the driving environment for object detection. (In some implementations, the visibility-sensing signal can be a part of a regular scanning of the driving environment.) The visibility-sensing signal can have a different amplitude, duration, polarization, temporal extent, phase and/or frequency modulation, and the like. For example, the visibility-sensing signal can have a larger intensity, a shorter (or longer) temporal extent, can be prepared with a different chirp (or with no frequency or phase modulation), and so on. The temporal extent of the intensity $I_0(t)$ of the output signal can refer to a pulse duration, e.g., the spread of an envelope function of the output signal, and so on. In some implementations, the visibility-sensing signal can be a part of the range- and velocity-sensing signals.

At block 710, method 700 can continue with determining a temporal intensity profile $I_R(t)$ of an optical sensing signal reflected from the particulate matter and comparing the temporal intensity profile $I_R(t)$—e.g., both the amplitude and the temporal extent—with the temporal intensity profile $I_0(t)$ of the output signal. Based on the results of the comparison, at block 720, the processing device performing method 700 can estimate the visibility range in the presence of the particulate matter. In one implementation, the extinction coefficient $\beta$ can be determined from fitting the reflected intensity $I_R(t)$ to a formula that expresses $I_R(t)$ in terms of the output intensity $I_0(t)$. The visibility range can then be determined from the extinction coefficient based on one or more models (e.g., as described above in relation to FIG. 5A). In some implementations, method 700 can be performed multiple times, to map visibility ranges along different spatial directions in the driving environment.

Figure 8:
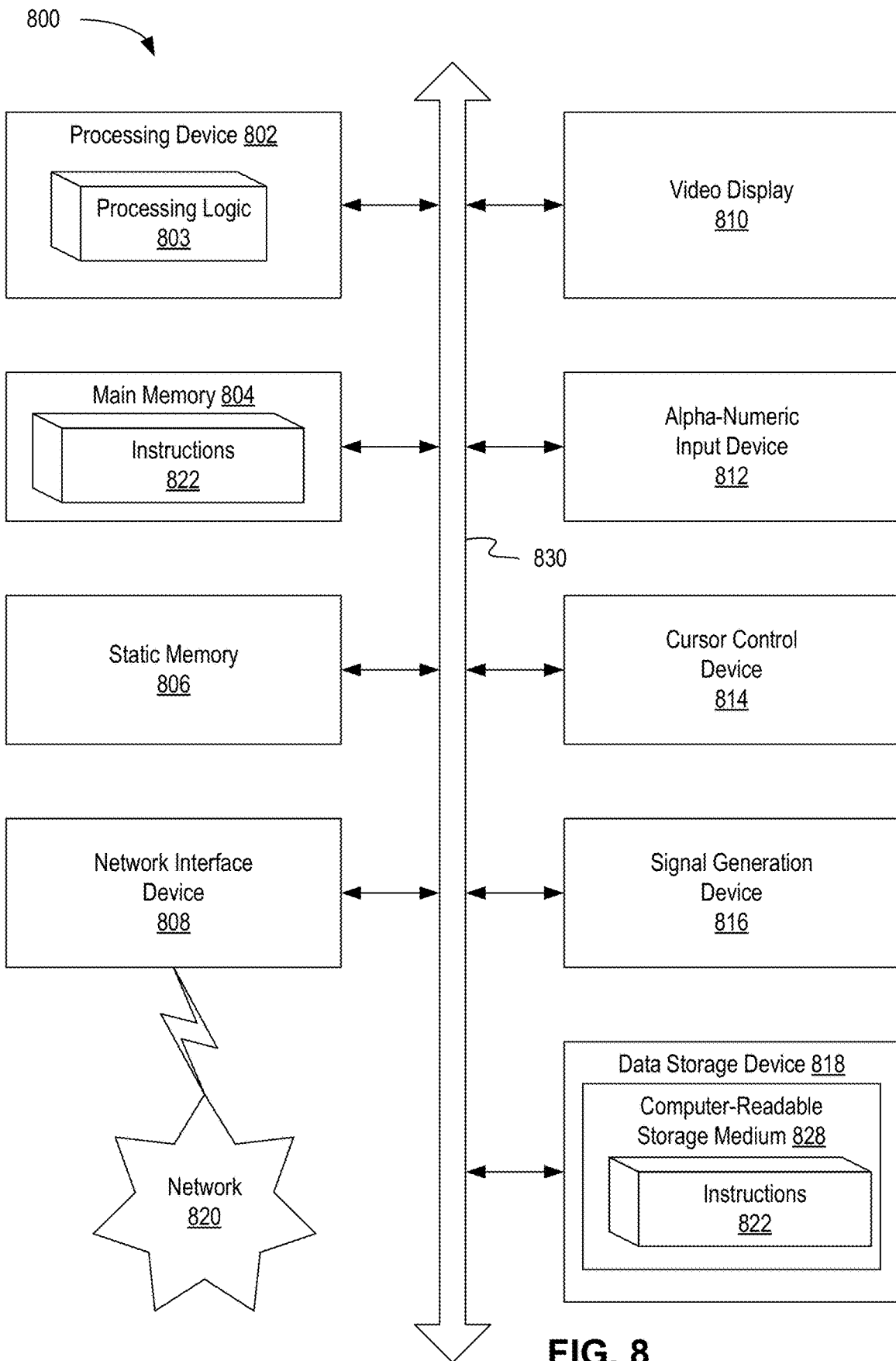
FIG. 8 depicts a block diagram of an example computer device capable of enabling lidar-assisted identification and classification of particulate matter, in accordance with some implementations of the present disclosure.

FIG. 8 depicts a block diagram of an example computer device 800 capable of enabling lidar-assisted identification and classification of particulate matter, in accordance with some implementations of the present disclosure. Example computer device 800 can be connected to other computer devices in a LAN, an intranet, an extranet, and/or the Internet. Computer device 800 can operate in the capacity of a server in a client-server network environment. Computer device 800 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 800 can include a processing device 802 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 818), which can communicate with each other via a bus 830.

Processing device 802 (which can include processing logic 803) represents one or more general-purpose processing devices such as a microprocessor, central processing unit, or the like. More particularly, processing device 802 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 802 can be configured to execute instructions performing method 600 of lidar-assisted identification and classification of particulate matter and method 700 of lidar-assisted determination of the visibility in the presence of particulate matter.

Example computer device 800 can further comprise a network interface device 808, which can be communicatively coupled to a network 820. Example computer device 800 can further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 816 (e.g., a speaker).

Data storage device 818 can include a computer-readable storage medium (or, more specifically, a non-transitory computer-readable storage medium) 828 on which is stored one or more sets of executable instructions 822. In accordance with one or more aspects of the present disclosure, executable instructions 822 can comprise executable instructions performing method 600 of lidar-assisted identification and classification of particulate matter and method 700 of lidar-assisted determination of the density of particulate matter.

Executable instructions 822 can also reside, completely or at least partially, within main memory 804 and/or within processing device 802 during execution thereof by example computer device 800, main memory 804 and processing device 802 also constituting computer-readable storage media. Executable instructions 822 can further be transmitted or received over a network via network interface device 808.

While the computer-readable storage medium 828 is shown in FIG. 8 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:
   a sensing system of a vehicle, the sensing system configured to:
   obtain a plurality of points, each point comprising one or more velocity values associated with an object reflecting a signal emitted by the sensing system; and
   a perception system of the vehicle, the perception system configured to:
   determine, using the one or more velocity values of each of a first subset of points of the plurality of points, that the first subset of points is associated with a particulate matter in an environment of the vehicle.

2. The system of claim 1, wherein each point of one or more of the first subset of the plurality of points further comprises one or more coordinates of the object.

3. The system of claim 2, wherein the one or more coordinates comprise a distance to the object, and the one or more velocity values comprise a radial component of a velocity of the object relative to the sensing system of the vehicle.

4. The system of claim 1, wherein the perception system is further configured to:
   cause, in response to determining that the first subset of points is associated with the particulate matter, a driving path of the vehicle to be determined in view of the particulate matter.

5. The system of claim 1, wherein the signal emitted by the sensing system comprises at least one of a lidar signal or a radar signal.

6. The system of claim 1, wherein the perception system is further configured to:
   determine, using fitting of the one or more velocity values of each of a second subset of points of the plurality of points to a rigid-body equation, that the second subset of points is associated with a rigid body in the environment of the vehicle.

7. The system of claim 6, wherein to determine that the second subset of the points is associated with the rigid body, the perception system applies a clustering algorithm to the second subset of points.

8. The system of claim 1, wherein to determine that the first subset of points is associated with the particulate matter, the perception system is configured to:
identify that the one or more velocity values of the first subset of points represent a disordered distribution of velocities.

9. The system of claim 1, wherein the perception system is further configured to:
identify a non-random component of the one or more velocity values of the first subset of points; and
determine, using the identified non-random component, a wind velocity.

10. The system of claim 1, wherein the perception system is further configured to:
identify, using an intensity of reflected signals used to obtain the first subset of points, a type of the particulate matter, the type of particulate matter comprising at least one of mist, fog, snow, or dust.

11. The system of claim 1, wherein the perception system is further configured to:
cause, in response to determining that the first subset of points is associated with the particulate matter, the sensing system to emit a probe signal;
determine a temporal intensity profile of a reflected signal generated by interaction of the probe signal with the particulate matter; and
estimate, using the temporal intensity profile of the reflected signal, a visibility range in the environment of the vehicle.

12. A system comprising:
a sensing system of a vehicle, the sensing system configured to:
obtain a plurality of points, each point comprising one or more velocity values associated with an object reflecting a signal emitted by the sensing system; and
a perception system of the vehicle, the perception system configured to:
distinguish a first distribution of velocities associated with the one or more velocity values of each of a first subset of points of the plurality of points from a second distribution of velocities associated with the one or more velocity values of each of a second subset of points of the plurality of points, wherein the first distribution of velocities is characterized by a higher degree of randomness than the second distribution of velocities;
associate the first subset of points with a particulate matter in an environment of the vehicle; and
associate the second subset of points with a solid body in the environment of the vehicle.

13. A method comprising:
obtaining, using a sensing system of a vehicle, a plurality of points, each point comprising one or more velocity values associated with an object reflecting a signal emitted by the sensing system; and
determining, using the one or more velocity values of each of a first subset of points of the plurality of points, that the first subset of points is associated with a particulate matter in an environment of the vehicle.

14. The method of claim 13, wherein each point of one or more of the first subset of the plurality of points further comprises one or more coordinates of the object, wherein the one or more coordinates comprise a distance to the object, and the one or more velocity values comprise a radial component of a velocity of the object relative to the sensing system of the vehicle.

15. The method of claim 13, further comprising:
determining, in response to determining that the first subset of points is associated with the particulate matter, a driving path of the vehicle in view of the particulate matter.

16. The method of claim 13, wherein the signal emitted by the sensing system comprises at least one of a lidar signal or a radar signal.

17. The method of claim 13, further comprising:
determining, using fitting of the one or more velocity values of each of a second subset of points of the plurality of points to a rigid-body equation, that the second subset of points is associated with a rigid body in the environment of the vehicle.

18. The method of claim 13, wherein determining that the first subset of points is associated with the particulate matter comprises:
identifying that the one or more velocity values of the first subset of the points represent a disordered distribution of velocities.

19. The method of claim 13, further comprising:
identifying, using an intensity of reflected signals used to obtain the first subset of points, a type of the particulate matter, the particulate matter comprising at least one of mist, fog, snow, or dust.

20. The method of claim 13, further comprising:
emitting, in response to determining that the first subset of points is associated with the particulate matter, a probe signal;
determining a temporal intensity profile of a reflected signal generated by interaction of the probe signal with the particulate matter; and
estimating, using the temporal intensity profile of the reflected signal, a visibility range in the environment of the vehicle.

* * * * *